(12) United States Patent
Ma et al.

(10) Patent No.: US 12,100,953 B2
(45) Date of Patent: Sep. 24, 2024

(54) METHOD, SYSTEM AND STORAGE MEDIUM FOR SUPPRESSING SUB/SUPER-SYNCHRONOUS OSCILLATION FOR DIRECT-DRIVE WIND TURBINE BASED ON ENERGY COMPENSATION

(71) Applicant: NORTH CHINA ELECTRIC POWER UNIVERSITY, Beijing (CN)

(72) Inventors: Jing Ma, Beijing (CN); Min Zhang, Beijing (CN); Zhenmiao Yang, Beijing (CN); Jiaming Zhang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 414 days.

(21) Appl. No.: 17/372,396

(22) Filed: Jul. 9, 2021

(65) Prior Publication Data

US 2022/0021211 A1    Jan. 20, 2022

(30) Foreign Application Priority Data

Jul. 15, 2020    (CN) .......................... 202010681241.2

(51) Int. Cl.
*H02J 3/24*    (2006.01)
*G05B 19/042*    (2006.01)
*H02J 13/00*    (2006.01)

(52) U.S. Cl.
CPC .............. *H02J 3/24* (2013.01); *G05B 19/042* (2013.01); *H02J 13/00002* (2020.01); *G05B 2219/2619* (2013.01)

(58) Field of Classification Search
CPC .... H02J 3/24; H02J 13/00002; H02J 2300/28; H02J 3/241; H02J 3/381; G05B 19/042;

(Continued)

(56) References Cited

FOREIGN PATENT DOCUMENTS

| CN | 106356874 A | * | 1/2017 | ................ H02J 3/24 |
| CN | 106972511 A | * | 7/2017 | ................ H02J 3/24 |
| WO | WO-2019128038 A1 | * | 7/2019 | ........... G05B 13/041 |

OTHER PUBLICATIONS

S. Zhao, R. Li, B. Gao, N. Wang and S. Song, "Sub and Super Synchronous Oscillations between Type 4 Wind Turbines and Series Compensated AC Transmission Systems," 2018 IEEE Power & Energy Society General Meeting (PESGM), Portland, OR, USA, 2018, pp. 1-5, doi: 10.1109/PESGM.2018.8586539. (Year: 2018).*

(Continued)

*Primary Examiner* — Mohammad Ali
*Assistant Examiner* — Dhruvkumar Patel
(74) *Attorney, Agent, or Firm* — Analects Legal LLC

(57) ABSTRACT

The disclosure relates to a method, system and storage medium for suppressing sub/super-synchronous oscillation for direct-drive wind turbine based on energy compensation. The method comprises: real-time collecting the bus voltage and the node injection current, obtaining the transient energy of direct-drive wind turbine; collecting the dynamic angle of PLL when the variation rate of the transient energy is positive, calculating the compensation energy and the increments of fundamental-frequency voltage of several supplementary energy branches based on the bus voltage and the node injection current and the dynamic angle of PLL; with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and then enabling the supplementary energy branches.

10 Claims, 16 Drawing Sheets

(58) Field of Classification Search
CPC .. G05B 2219/2619; G05B 11/42; Y02E 10/76
See application file for complete search history.

(56) References Cited

OTHER PUBLICATIONS

W. Du, et al., 'Concept of Modal Repulsion for Examining the Subsynchronous Oscillations Caused by Wind Farms in Power Systems', IEEE Transactions on Power Systems, 2019, 34, (1), pp. 518-526.

K. Gu, et al., 'Sub-synchronous interactions in power systems with wind turbines: a review', IET Renewable Power Generation, 2019, 13, (1), pp. 4-15.

K. Narendra, et al., 'New microprocessor based relay to monitor and protect power systems against sub-harmonics', 2011 IEEE Electrical Power and Energy Conference, Winnipeg, MB, 2011, pp. 438-443.

H. Liu, et al., 'Subsynchronous Interaction Between Direct-Drive PMSG Based Wind Farms and Weak AC Networks', IEEE Transactions on Power Systems, 2017, 32, (6), pp. 4708-4720.

S. O. Faried, et al., 'Utilizing DFIG-Based Wind Farms for Damping Subsynchronous Resonance in Nearby Turbine-Generators', IEEE Transactions on Power Systems, 2013, 28, (1), pp. 452-459.

J. Zhang, et al., 'Subsynchronous Control Interaction Analysis and Trigger-based Damping Control for Doubly Fed Induction Generator-based Wind Turbines', Electric Power Components and Systems, 2016, 44, (7), pp. 713-725.

H. Tang, et al., 'Impact of grid side converter of DFIG on sub-synchronous oscillation and its damping control', 2016 IEEE PES Asia-Pacific Power and Energy Engineering Conference (APPEEC), Xi'an, 2016, pp. 2127-2130.

H. Chen, et al., 'Sub-Synchronous Oscillation Caused by HVDC and the Damping Characteristic Analysis', Advanced Materials Research, 2014, 971-973, pp. 1353-1356.

W. Ning, et al., 'Method to suppress sub-synchronous oscillation of DFIG-based wind farms based on virtual impedance', The Journal of Engineering, 2017, 2017, (13), pp. 2173-2177.

L. Wang, et al., 'Mitigation of Multimodal Subsynchronous Resonance Via Controlled Injection of Supersynchronous and Subsynchronous Currents', IEEE Transactions on Power Systems, 2014, 29, (3), pp. 1335-1344.

S. Wang, et al., 'A control strategy of STATCOM for suppressing subsynchronous oscillation', 12th IET International Conference on AC and DC Power Transmission, Beijing, 2016, pp. 1-5.

Y. Yan, et al., 'Interaction analysis of multi VSCs integrated into weak grid in current control time-scale', 2016 IEEE Power and Energy Society General Meeting (PESGM), Boston, MA, 2016, pp. 1-6.

H. Liu, et al., 'Voltage Stability and Control of Offshore Wind Farms with AC Collection and HVDC Transmission', IEEE Journal of Emerging and Selected Topics in Power Electronics, 2014, 2, (4), pp. 1181-1189.

M. Anju, et al., 'Co-ordination of SMES with STATCOM for mitigating SSR and damping power system oscillations in a series compensated wind power system', 2013 International Conference on Computer Communication and Informatics, Coimbatore, 2013, pp. 1-6.

Moon, Young Hyun, et al., 'Energy conservation law and its application for the direct energy method of power system stability', IEEE Power Engineering Society Winter Meeting IEEE, New York, 1999, pp. 695-700.

W. Liu, et al., 'Frequency-coupled impedance model based subsynchronous oscillation analysis for direct-drive wind turbines connected to a weak AC power system', The Journal of Engineering, 2019, 2019, (18), pp. 4841-4846.

* cited by examiner real-time collecting the bus voltage and the node injection current of the wind turbine, obtaining the transient energy of direct-drive wind turbine

↓ collecting the dynamic angle of PLL when the variation rate of the transient energy of direct-drive wind turbine is positive, calculating the compensation energy and the increments of fundamental-frequency voltage of several supplementary energy branches based on the bus voltage and the node injection current of the wind turbine and the dynamic angle of PLL

↓ with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and enabling the supplementary energy branches after the compensation coefficients are determined

Figure 1

METHOD, SYSTEM AND STORAGE MEDIUM FOR SUPPRESSING SUB/SUPER-SYNCHRONOUS OSCILLATION FOR DIRECT-DRIVE WIND TURBINE BASED ON ENERGY COMPENSATION

CROSS-REFERENCE TO RELATED APPLICATION

This application claims priority to Chinese Patent Application No. 202010681241.2, filed on Jul. 15, 2020, which is hereby incorporated by reference in its entirety.

TECHNICAL FIELD

The disclosure relates to the technical field of wind generation, and particularly relates to a method, system and storage medium for suppressing sub/super-synchronous oscillation for direct-drive wind turbine based on energy compensation.

BACKGROUND

As the percentage of PMSG (permanent magnet synchronous generators) in the installed capacity of local areas rapidly increases, sub/super-synchronous oscillation caused by the integration of PMSG to weak power grid via inverter occurs ever more frequently, greatly intimidating the safe and stable operation of power grid. Currently, due to lack of effective control measures to suppress sub/super-synchronous oscillation of wind turbines, passive measures such as generator tripping are often taken, which sacrifices large amount of wind power output and causes huge economic loss. Therefore, it is urgent to study active control method to suppress sub/super-synchronous oscillation of direct-drive wind turbine.

Scholars worldwide have conducted extensive research on measures to suppress sub/super-synchronous oscillation, and there are mainly three methods used—adjusting controller structure, adding suppression device and optimizing controller parameters. The method of adjusting controller structure realizes suppression of sub-synchronous oscillation by introducing damping control links. Since no extra equipment is added, this method is economic. The method of adding suppression device suppresses oscillation by designing damping devices and injecting reverse sub/super-synchronous current to power grid. This method has been developed and applied to certain extent. The method of optimizing controller parameters can reduce the risk of sub/super-synchronous oscillation by changing the resonance point of sub-synchronous oscillation between wind turbine and power grid, which is achieved by optimizing the controller parameters of wind turbine and parameters of series-type FACTS (Flexible AC Transmission Systems) and regulating the output impedance characteristic of wind turbine.

However, the above methods are mostly concerning single oscillation frequency and do not consider the suppression effect at other oscillation frequencies. Besides, the impact of variation of controller parameters on fundamental frequency characteristic and dynamic response characteristic of wind turbine is neglected.

SUMMARY

In view of the above analysis, the disclosure aims to propose a method and system for suppressing sub/super-synchronous oscillation for direct-drive wind turbine based on energy compensation. It is used to solve the problem of stable operation of the wind power grid-connected system at the current stage.

The purpose of the present disclosure is mainly achieved by the following technical solutions.

On the one hand, the disclosure proposes a method for suppressing sub/super-synchronous oscillation for direct-drive wind turbine based on energy compensation, including, step S1: real-time collecting the bus voltage and the node injection current of the wind turbine, obtaining the transient energy of direct-drive wind turbine;

step S2: collecting the dynamic angle of PLL when the variation rate of the transient energy of direct-drive wind turbine is positive, calculating the compensation energy and the increments of fundamental-frequency voltage of several supplementary energy branches based on the bus voltage and the node injection current of the wind turbine and the dynamic angle of PLL; and step S3: with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and enabling the supplementary energy branches after the compensation coefficients are determined.

On the basis of the above scheme, the disclosure also makes the following improvements:

Further, wherein the supplementary energy branches in the step S2 includes, the supplementary energy branches of current loop proportional control link, current loop integral control link and dq axis cross coupling control link.

Further, wherein the supplementary energy branch of current loop proportional control link, the input term is $i_{dc}^*$, the proportional link with the compensation coefficient $k_{V1}$ is constructed to act on the d-axis output voltage of grid-side converter control links of direct-drive wind turbine;

the compensation energy of supplementary energy branch of current loop proportional control link $W_{V1}$ is $$W_{V1} = k_{p2} \int i_{dc}^* i_{dc} d\Delta\theta_{pll} \qquad (1)$$

where $k_{p2}$ is proportion coefficient of current inner loop; $i_{dc}^*$ is d-axis reference value of current; $i_{dc}$ is respectively d-axis component of current at the terminal of direct-drive wind turbine; $\Delta\theta_{pll}$ represents the dynamic angle of PLL generated;

the increment of fundamental-frequency voltage of supplementary energy branch of current loop proportional control link $\Delta u_{dc1}^*$ is $$\Delta u_{dc1}^* = -k_{p2} i_{dc}^* \qquad (2).$$

Further, wherein the supplementary energy branch of current loop integral control link, the input term is $i_{dc}^*$, the integral link with the compensation coefficient $k_{V2}$ is constructed to act on the d-axis output voltage of grid-side converter control links of direct-drive wind turbine;

the compensation energy of supplementary energy branch of current loop integral control link $W_{V2}$ is $$W_{V2} = k_{i2} \int i_{dc}^* i_{dc} t d\Delta\theta_{pll} \qquad (3)$$

where $k_{i2}$ is integral coefficient of current inner loop; t is the oscillation time;

the increment of fundamental-frequency voltage of supplementary energy branch of current loop integral control link $\Delta u_{dc2}{}^*$ is $$\Delta u_{dc2}{}^* = -k_{i2}\int i_{dc}{}^* dt \qquad (4)$$

Further, wherein the supplementary energy branch of dq axis cross coupling control link, the input term is $i_{dc}$, the proportion link with the compensation coefficient $k_{V3}$ is constructed to act on the d-axis output voltage of grid-side converter control links of direct-drive wind turbine, the input term is $i_{qc}$, the proportion link with the compensation coefficient $k_{V3}$ is constructed to act on the q-axis output voltage of grid-side converter control links of direct-drive wind turbine;

the compensation energy of supplementary energy branch of dq axis cross coupling control link $W_{V3}$ is $$W_{V3} = \omega_2 L_2 \int (i_{dc}{}^2 + i_{qc}{}^2)\Delta\theta_{pll} d\Delta\theta_{pll} \qquad (5)$$

where $i_{qc}$ is respectively q-axis components of current at the terminal of direct-drive wind turbine; $\omega_2$ is the angular frequency of power grid; $L_2$ is the reactance of outlet line;

the increment of fundamental-frequency voltage of supplementary energy branch of dq axis cross coupling control link $\Delta u_{dc3}{}^*$ and $\Delta u_{qc3}{}^*$ are $$\begin{cases} \Delta u_{dc3}^* = 0 \\ \Delta u_{qc3}^* = 0 \end{cases} \qquad (6)$$

Further, wherein the step S3 includes, the objective is $$\max f = \frac{\left|\sum_{i=1}^{n} k_{Vi} W_{Vi}\right|}{\left|\sum_{i=1}^{n} k_{Vi} \Delta u_{d(q)ci}^*\right|} \qquad (7)$$

where $k_{Vi}$ is the compensation coefficient of the ith supplementary energy branch; $W_{Vi}$ is the compensation energy of the ith supplementary energy branch; $\Delta u_{d(q)ci}{}^*$ is the increment of d/q-axis fundamental-frequency voltage of the ith supplementary energy branch; n is the total number of supplementary energy branches.

Further, the constraint of the frequency-domain characteristic of control links is $$\begin{cases} k_{V1} = \dfrac{1 - L_2\omega_{Plc}^2\left(\sqrt{1+4\xi_t^4} - 2\xi_t^2\right)}{k_{p2}} \\ k_{V2} = \dfrac{1 - 2L_2\omega_{Plc}\left(\sqrt{\sqrt{1+4\xi_t^4} - 2\xi_t^2}\right)}{k_{i2}} \\ k_{V3} = \dfrac{\omega_{Lc}}{w_2\Delta\theta_{pll}} \end{cases} \qquad (8)$$

where $\xi_t$ is the damping ratio of supplementary branches of current loop proportional and integral control link; $\omega_{Plc} = 2\pi * f_{Plc}$; $f_{Plc}$ is the control bandwidth of supplementary branches of current loop proportional and integral control link; $\omega_{Lc} = 2\pi * f_{Lc}$; $f_{Lc}$ is the control bandwidth of supplementary branch of dq axis cross coupling control link.

Further, the constraint of fundamental-frequency voltage characteristic of control links is $$\sqrt{\sum_{i=1}^{n} (k_{Vi}\Delta u_{d(q)ci}^*)^2} \leq 5\% \, U_n \qquad (9)$$

where $U_n$ is the rated voltage at the terminal of direct-drive wind turbine.

Further, the pattern search method is used to determine the compensation coefficients of supplementary branches.

On the one hand, the disclosure proposes a system for suppressing sub/super-synchronous oscillation for direct-drive wind turbine based on energy compensation, including, a first processor of transient energy acquisition is used to real-time collect the bus voltage and the node injection current of the wind turbine and obtain the transient energy of direct-drive wind turbine;

a second processor of supplementary energy branches construction, used to collect the dynamic angle of PLL when the variation rate of the transient energy of direct-drive wind turbine is positive and calculate the compensation energy and the increments of fundamental-frequency voltage of several supplementary energy branches based on the bus voltage and the node injection current of the wind turbine and the dynamic angle of PLL;

a third processor of parameter optimization of supplementary energy branches, used to determine the compensation coefficients of supplementary energy branches with the compensation energy of supplementary branches reaching the maximum and the increment of fundamental-frequency voltage being the minimum as the objective and with the frequency-domain characteristic and fundamental-frequency voltage characteristic of control links being satisfied as the constraints; and a result output, used to enable the supplementary energy branches after the compensation coefficients are determined.

This disclosure further provides a storage medium encoded with a set of machine-executable instructions to perform a method for suppressing sub/super-synchronous oscillation for direct-drive wind turbine based on energy compensation, the method comprises:

real-time collecting the bus voltage and the node injection current of the wind turbine, obtaining the transient energy of direct-drive wind turbine;

collecting the dynamic angle of PLL when the variation rate of the transient energy of direct-drive wind turbine is positive, calculating the compensation energy and the increments of fundamental-frequency voltage of several supplementary energy branches based on the bus voltage and the node injection current of the wind turbine and the dynamic angle of PLL; and with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and enabling the supplementary energy branches after the compensation coefficients are determined.

The beneficial effects of the present disclosure are as follows:

The disclosure proposes a method and system for suppressing sub/super-synchronous oscillation for direct-drive wind turbine based on energy compensation, which can realize fast frequency-dependent suppression of sub/super-synchronous oscillation in different frequency bands concerning different grid strengths. Besides, the supplementary branches do not affect fundamental-frequency dynamic characteristic of wind turbine.

In the disclosure, the above technical solutions can also be combined with each other to realize more preferred combination schemes. Other features and advantages of the disclosure will be described in subsequent specifications, and some of the advantages may become apparent from the description or understood by implementing the disclosure. The object and other advantages of the disclosure can be realized and obtained through the description, the claims and the drawings.

BRIEF DESCRIPTION OF DRAWINGS

The attached figures are only for the purpose of illustrating specific embodiments, and are not considered to limit the present disclosure. In the whole figures, the same reference symbols indicate the same components.

FIG. 1 is a flow chart of a method of suppressing sub/super-synchronous oscillation for direct-drive wind turbine based on energy compensation in the first embodiment of the present disclosure;

DESCRIPTION OF EMBODIMENTS

Figure 2:
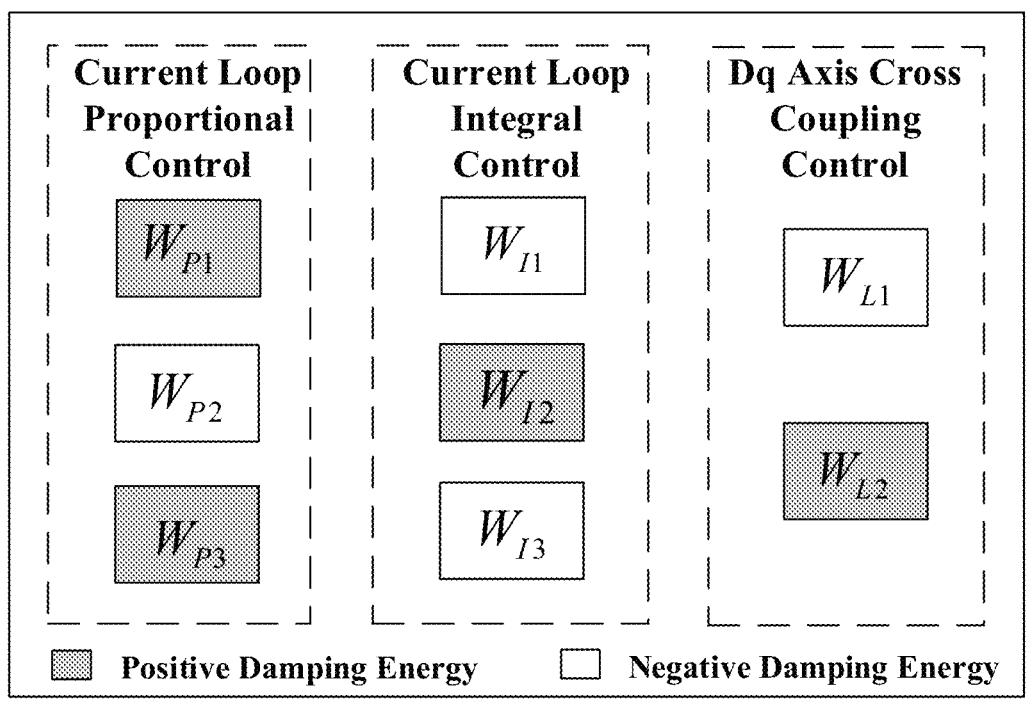
FIG. 2 is a schematic diagram of the transient energy characteristics of different control links in direct-drive wind turbine in the first embodiment of the present disclosure.

The preferred embodiments of the disclosure will be described below in combination with the attached figures in detail, where the attached figures form part of the disclosure and, together with the embodiments of the disclosure, are used to explain the principles of the disclosure, not to define the scope of the disclosure and not intended to limit the scope of the disclosure.

The First Embodiment

This embodiment proposes a method for suppressing sub/super-synchronous oscillation for direct-drive wind turbine based on energy compensation, as shown in FIG. 1, which includes the following steps:

step S1: real-time collecting the bus voltage and the node injection current of the wind turbine, obtaining the transient energy of direct-drive wind turbine;

according to transient energy construction method based on node voltage equation, the expression of transient energy can be obtained using the terminal and node information of direct-drive wind turbine:

$$W_{PMSG} = \int Im(-I_G * dU_G) \quad (1)$$

where $U_G$ is the bus voltage vector of direct-drive wind turbine. $I_G$ is the node injection current of direct-drive wind turbine. Im( ) means extracting the imaginary part of a complex.

Step S2: collecting the dynamic angle of PLL when the variation rate of the transient energy of direct-drive wind turbine is positive, calculating the compensation energy and the increments of fundamental-frequency voltage of several supplementary energy branches based on the bus voltage and the node injection current of the wind turbine and the dynamic angle of PLL;

It should be noted that if the variation rate of transient energy of direct-drive wind turbine is constantly positive, direct-drive wind turbine will continuously generate transient energy during oscillation and exhibit negative damping characteristic, causing the system to go unstable. Thus, it is necessary to suppress sub/super-synchronous oscillation of direct-drive wind turbine at this time. In this embodiment, multiple supplementary energy branches are constructed to supplement energy to realize the suppression of sub/super-synchronous frequency oscillation. The specific process is as follows:

In this embodiment, transform equation (1) to dqc coordinate system of direct-drive wind turbine control system, so that the transient energy of direct-drive wind turbine can be expressed as $$W_{PMSG} = \int (i_{dc}u_{dc} + i_{qc}u_{qc})d\Delta\theta_{pll} + \int i_{dc}du_{qc} - \int i_{qc}du_{dc} \quad (2)$$

where $i_{dc}$, $i_{qc}$, $u_{dc}$ and $u_{qc}$ are respectively d-axis and q-axis components of current and voltage at the terminal of direct-drive wind turbine; $\Delta\theta_{pll}$ represents the dynamic angle of PLL (Phase Locked Loop) generated during sub/super-synchronous oscillation. It should be noted that if the variation rate of transient energy of direct-drive wind turbine is constantly positive, direct-drive wind turbine will continuously generate transient energy during oscillation and exhibit negative damping characteristic, causing the system to go unstable. If we want to suppress the oscillation of direct-drive wind turbine from the control level, we need to use the transient energy in dqc coordinate system of direct-drive wind turbine control system, we need to collect the dynamic angle of PLL.

Since the terminal part of direct-drive wind turbine is electrically decoupled from the grid, and the time scale of wind speed variation is much larger than the time scale of converter control, when studying the transient energy at the terminal of direct-drive wind turbine during sub/super-synchronous oscillation, the impact of grid-side converter is emphasized. Besides, consider that in grid-side converter cascade control, voltage outer loop is dynamically decoupled from current inner loop, and the band width of voltage outer loop is much smaller than the band width of current inner loop, thus the dynamic response of voltage outer loop is slow in sub/super-synchronous frequency band. Therefore, this embodiment is focused on the impact of current inner loop and PLL on the transient energy of direct-drive wind turbine grid-side converter.

In dqc coordinate system of direct-drive wind turbine control system, the control equations of grid-side converter are $$\begin{cases} u_{dc} = \left(k_{p2} + \dfrac{k_{i2}}{s}\right)(i_{dc}^* - i_{dc}) - \omega_2 L_2 i_{qc} + e_{dc} \\ u_{qc} = \left(k_{p2} + \dfrac{k_{i2}}{s}\right)(i_{qc}^* - i_{qc}) + \omega_2 L_2 i_{dc} + e_{qc} \end{cases} \quad (3)$$

where $k_{p2}$ and $k_{i2}$ are proportion and integration coefficients of current inner loop; $i_{dc}^*$ and $i_{qc}^*$ are d-axis and q-axis reference values of current; $\omega_2$ is the angular frequency of power grid, $\omega_2 = 2*\pi*50$; $L_2$ is the reactance of outlet line; $e_{dc}$ and $e_{qc}$ are d-axis and q-axis components of grid voltage in dqc coordinate system.

Combine equation (2) and equation(3) so that the transient energy of direct-drive wind turbine in dqc coordinate system can be obtained, which is converted into dq coordinate system and decomposed into transient energy of each control loop of direct-drive wind turbine, as shown in equations (4)-(9).

$$W_{PMSG} = W_P + W_I + W_L \quad (4)$$

where $W_P$ is the transient energy led by current-loop proportion link; $W_I$ is the transient energy led by current-loop integration link; $W_L$ is the transient energy caused by the coupling between d-axis and q-axis; among them, $W_P$ is $$W_P = W_{P1} + W_{P2} + W_{P3} \quad (5)$$

$$W_{P1} = k_{p2}\int[i_{qs}di_{ds} - i_{ds}di_{qs}] \quad (6)$$

$$W_{P2} = k_{p2}\int(i_{ds} + i_{qs}\Delta\theta_{pll})i_{dc}^* d\Delta\theta_{pll}$$

$$W_{P3} = -k_{p2}\int(i_{ds}^2 + i_{qs}^2)\Delta\theta_{pll}^2 d\Delta\theta_{pll}$$

$W_I$ is $$W_I = W_{I1} + W_{I2} + W_{I3} \quad (7)$$

$$W_{I1} = k_{i2}\int(i_{dc}^* t(i_{ds} + i_{qs}\Delta\theta_{pll})d\Delta\theta_{pll}$$

$$W_{I2} = -k_{i2}\int(i_{ds} + i_{qs}\Delta\theta_{pll})(\int(i_{ds} + i_{qs}\Delta\theta_{pll})dt)d\Delta\theta_{pll}$$

$$W_{I3} = -k_{i2}\int(-i_{ds}\Delta\theta_{pll} + i_{qs})(\int(-i_{ds}\Delta\theta_{pll} + i_{qs})dt)d\Delta\theta_{pll} \quad (8)$$

$W_L$ is $$W_L = W_{L1} + W_{L2} \quad (9)$$

$$W_{L1} = \omega_2 L_2 \int(i_{ds}^2 + i_{qs}^2)\Delta\theta_{pll}d\Delta\theta_{pll}$$

$$W_{L2} = \omega_2 L_2 \int(i_{ds}di_{ds} + i_{qs}di_{qs}) \quad (10)$$

According to Lyapunov's second stability theorem, for a free dynamic system, if the variation rate of system overall energy W (W>0) with time $\dot{W}(x)$ is constantly negative, system overall energy will keep decreasing until it reaches the minimum value, then the system will be stable in an equilibrium state. Therefore, by analyzing the accumulation and consumption trends of the overall energy of direct-drive wind turbine $W_{PMSG}$, the stability of system can be identified. If $\Delta W_{PMSG}$ keeps decreasing, i.e. if $\Delta \dot{W}_{PMSG}$ is constantly negative, direct-drive wind turbine will absorb transient energy during sub/super-synchronous oscillation and exhibit positive damping characteristic. In this case, system oscillation will gradually converge and the system will go stable. Otherwise, if $\Delta \dot{W}_{PMSG}$ is constantly positive, direct-drive wind turbine will continuously generate transient energy during oscillation and exhibit negative damping characteristic, causing the system to go unstable. Thus, the variation rates of transient energy of different control links $\Delta \dot{W}_{PMSG}$ characterize the accumulation and consumption trends of the overall energy of direct-drive wind turbine, and the sign of $\Delta \dot{W}_{PMSG}$ (being positive or negative) directly determines the stability of system.

FIG. 2 is a schematic diagram of the transient energy characteristics of different control links in direct-drive wind turbine. Among them, $\Delta \dot{W}_{P1}$, $\Delta \dot{W}_{P3}$, $\Delta \dot{W}_{I2}$ and $\Delta \dot{W}_{L2}$ are all negative, thus they have positive damping effect on system oscillation and make for the converging of oscillation. $\Delta \dot{W}_{P2}$, $\Delta \dot{W}_{I1}$, $\Delta \dot{W}_{I3}$ and $\Delta \dot{W}_{L1}$ are positive, thus they have negative damping effect on system oscillation and make against the stability of system. The amplitude of $\Delta \dot{W}_{I3}$ is much smaller than the amplitudes of the other three terms, thus $\Delta \dot{W}_{I3}$ can be neglected. The derivation process of transient energy characteristics of different control links in direct-drive wind turbine is as follows.

In the transient energy model of direct-drive wind turbine, the damping characteristic of transient energy of different control links is the key factor that determines whether the oscillation of direct-drive wind turbine converges or not. Thus, screening out the control links that generate negative damping energy is key to suppressing oscillation and guaranteeing the stable operation of system. The transient energy characteristics of different control links in grid-side converter are analyzed as follows.

During sub/super-synchronous oscillation, sub/super-synchronous frequency ($\omega_-/\omega_+$) current components can be expressed as:

$$\begin{cases} \Delta i_{ds} = I_d e^{\lambda t}\cos(\omega_s t + \varphi_d) \\ \Delta i_{qs} = I_q e^{\lambda t}\sin(\omega_s t + \varphi_q) \end{cases} \quad (11)$$

where $I_d$, $I_q$, $\varphi_d$ and $\varphi_1$ are the amplitudes and initial phase angles of d-axis and q-axis components of oscillation current; $\lambda$ is the oscillation attenuation coefficient; $\omega_s$ is the frequency of oscillation current, $\omega_s = \omega_+ - \omega_2 = \omega_2 - \omega_{31}$.

Due to sub/super-synchronous frequency voltage components, PLL dynamic angle will be generated, which can be expressed as:

$$\Delta\theta_{pll} = -k_{p\theta}\int \Delta u_{qs}dt - k_\theta \int\int \Delta u_{qs}dtdt \quad (12)$$
$$= \theta_0 + \Delta\theta_1 \sin(\omega_s t + \beta)$$

Where $k_{p\theta}$ and $k_{i\theta}$ are proportion and integration coefficients of PLL; $\theta_0$ is the phase angle caused by outlet line reactance; $\Delta\theta_1$ and $\beta$ are the oscillation amplitude and initial phase angle of PLL dynamic angle.

Apply equation (11) and (12) to equation (6), (8) and (10), so that the variation rate of transient energy of each control link in grid-side converter $\Delta\dot{W}_{PMSG}$ can be obtained:

$$\dot{W}_{P1} = -k_{p2}\omega_s I_d I_q e^{2\lambda t}\cos(\varphi_d - \varphi_q) \quad (13)$$

$$\Delta\dot{W}_{P2} = \tfrac{1}{2}k_{p2}\omega_s i_{dc}{}^* I_d \Delta\theta_1 e^{2\lambda t}\cos(\varphi_d - \beta) \quad (14)$$

$$\Delta\dot{W}_{P3} = -k_{p2}\omega_s i_{ds0}I_d\theta_0{}^2\Delta\theta_1 e^{2\lambda t}\cos(\varphi_d - \beta) \quad (15)$$

$$\Delta\dot{W}_{I1} = \tfrac{1}{2}k_{i2}\omega_s I_d \Delta\theta_1 e^{2\lambda t}\cos(\varphi_d - \beta)\int i_{dc}{}^* dt \quad (16)$$

$$\Delta\dot{W}_{I2} = -\tfrac{1}{2}k_{i2}\omega_s i_{dc0}I I_d \Delta\theta_1 e^{2\lambda t}\cos(\varphi_d - \beta) \quad (17)$$

$$\Delta\dot{W}_{I3} = \tfrac{1}{2}k_{i2}\omega_s \theta_0 i_{qs0}II_d \Delta\theta_1 e^{2\lambda t}\cos(\varphi_d - \beta) \quad (18)$$

$$\Delta\dot{W}_{L1} = \tfrac{1}{2}\omega_2\omega_s L_2 i_{qs0}I_d \Delta\theta_1 e^{2\lambda t}\cos(\varphi_d - \beta) \quad (19)$$

$$\Delta\dot{W}_{L2} = -\omega_2\omega_s L_2 I_d(\tfrac{1}{2}i_{qs0} + i_{ds0}\theta_0)\Delta\theta_1 e^{2\lambda t}\cos(\varphi_d - \beta) \quad (20)$$

where $i_{ds0}$ and $i_{qs0}$ are d-axis and q-axis components of steady-state current at the terminal of grid-side converter under normal conditions; t is the oscillation time, which starts from the occurrence of oscillation.

The variation rates of transient energy of different control links $\Delta\dot{W}_{PMSG}$ characterize the accumulation and consumption trends of the overall energy of direct-drive wind turbine, and the sign of $\Delta\dot{W}_{PMSG}$ (being positive or negative) directly determines the stability of system. It can be seen from equations (13)-(20) that, the sign of $\Delta\dot{W}_{P1}$ is determined by $\cos(\varphi_d - \varphi_q)$, and the signs of equations (14)-(20) are determined by $\cos(\varphi_d - \beta)$. Angular difference $\varphi_d - \varphi_q$ and $\varphi_d - \beta$ have to do with the initial phase angles of sub/super-synchronous frequency current and PLL dynamic angle, which are analyzed in detail below.

1) Initial Phase Angle of Sub/Super-Synchronous Frequency Current

The initial phase angle of sub/super-synchronous frequency current can be obtained by extending sub/super-synchronous frequency components:

$$\cos(\varphi_d - \varphi_q) = \frac{I_+^2 - I_-^2}{I_d I_q} \quad (21)$$

where $I_-$ and $I_+$ are the amplitudes of sub/super-synchronous frequency phase-A current.

When sub/super-synchronous oscillation occurs, super-synchronous frequency components are usually larger than sub-synchronous frequency components, thus equation (21) >0, and equation (13) is constantly negative, i.e. $\Delta\dot{W}_{P1} < 0$. Therefore, $W_{P1}$ can effectively reduce the overall energy of wind turbine $W_{PMSG}$ and make for the stability of system.

2) Initial Phase Angle of PLL Dynamic Angle

Detailed derivation of equation (12) reveals that, the initial phase angle of PLL dynamic angle $\beta$ has to do with the initial phase angle of q-axis sub/super-synchronous frequency voltage $\phi_q$, i.e. $\beta = \phi_q + \phi$, where $\phi$ satisfies the following equations:

$$\sin\phi = \frac{k_{p\theta}(\omega_s^2 + \lambda^2)}{\sqrt{k_{p\theta}^2(\omega_s^2 + \lambda^2)^2 + k_{i\theta}^2\omega_s^2}} \quad (22)$$

$$\cos\phi = \frac{k_{i\theta}\omega_s}{\sqrt{k_{p\theta}^2(\omega_s^2 + \lambda^2)^2 + k_{i\theta}^2\omega_s^2}}$$

where $\cos\phi$ and $\sin\phi$ are both positive, and $\sin\phi$ is slightly larger than $\cos\phi$.

Apply $\beta = \phi_q + \phi$ to $\cos(\varphi_d - \beta)$, so that $$\cos(\varphi_d - \beta) = \cos(\varphi_d - \phi_q)\cos\phi + \sin(\varphi_d - \phi_q)\sin\phi \quad (23)$$

Similar to the derivation process of equation (21), it can be obtained that angular difference $\varphi_d - \phi_q$ satisfies the following equations:

$$\begin{cases} \cos(\varphi_d - \phi_q) = \dfrac{I_+ U_+ \cos(\alpha_+ - \varepsilon_+) + I_- U_+ \cos(\alpha_- - \varepsilon_+)}{I_d U_q} - \\ \qquad\qquad \dfrac{I_+ U_- \cos(\alpha_+ - \varepsilon_-) + I_- U_- \cos(\alpha_- - \varepsilon_-)}{I_d U_q} \\ \sin(\varphi_d - \phi_q) = \dfrac{I_+ U_+ \sin(\alpha_+ - \varepsilon_+) + I_- U_+ \sin(\alpha_- - \varepsilon_+)}{I_d U_q} - \\ \qquad\qquad \dfrac{I_+ U_- \sin(\alpha_+ - \varepsilon_-) + I_- U_- \sin(\alpha_- - \varepsilon_-)}{I_d U_q} \end{cases} \quad (24)$$

where $U_-$, $U_+$, $\varepsilon_-$ and $\varepsilon_+$ are the amplitudes and initial phase angles of sub/super-synchronous frequency phase-A voltage; $\alpha_-$ and $\alpha_+$ are the initial phase angles of sub/super-synchronous frequency phase-A current; $U_q$ is the amplitude of q-axis oscillation voltage.

Consider that during sub/super-synchronous oscillation of direct-drive wind turbine, super-synchronous frequency components are larger than sub-synchronous frequency components, $\varphi_d - \phi_q$ can be approximated to the difference between initial phase angles of super-synchronous frequency current and super-synchronous frequency voltage.

When oscillation occurs in direct-drive wind turbine, since the reference value of reactive power of outer-loop control is set to be 0, and the reference value of active power is rated value, the output power is mainly active power. Thus, the difference between initial phase angles of super-synchronous frequency current and super-synchronous frequency voltage is approximately 0, i.e. $\varphi_d - \phi_q \approx 0$. Therefore, in equation (23) the value of $\cos(\varphi_d - \phi_q)$ is positive and much larger than $\sin(\varphi_d - \phi_q)$. Besides, since $\cos\phi$ and $\sin\phi$ are both positive, and $\sin\phi$ is slightly larger than $\cos\phi$, equation (23) is constantly positive, i.e. $\cos(\varphi_d - \beta) > 0$.

Therefore, equation (15), (17) and (20) are constantly negative, i.e. $\Delta\dot{W}_{P3}$, $\Delta\dot{W}_{I2}$ and $\Delta\dot{W}_{L2}$ are all negative, thus they have positive damping effect on system oscillation and make for the converging of oscillation. Equation (14), (16), (18) and (19) are constantly positive, i.e. $\Delta\dot{W}_{P2}$, $\Delta\dot{W}_{I1}$, $\Delta\dot{W}_{I3}$ and $\Delta\dot{W}_{L1}$ are positive, thus they have negative damping effect on system oscillation and make against the stability of system. The amplitude of $\Delta \dot{W}_{I3}$ is much smaller than the amplitudes of the other three terms, thus $\Delta \dot{W}_{I3}$ can be neglected. The transient energy characteristics of different control links in direct-drive wind turbine are shown in FIG. 2. Based on the above analysis, $W_{P2}$, $W_{I1}$ and $W_{L1}$ are the negative damping energy terms that lead the oscillation of direct-drive wind turbine.

Therefore, through the above analysis, it can be seen that by establishing the transient energy model of direct-drive wind turbine containing grid-side converter control links, $W_{P2}$, $W_{I1}$ and $W_{L1}$ are the negative damping energy leading to the oscillation of direct-drive wind turbine extracted from the transient energy model.

After the negative damping energy which that lead the oscillation of direct-drive wind turbine is determined, backward deduction method is used to construct supplementary energy branches in this embodiment, which transforms from the negative damping energy to voltage compensation of supplementary energy branches; and the compensation energy and the increment of fundamental-frequency voltage of supplementary branches are calculated;

Specifically, the supplementary energy branches, includes:

(1) The Supplementary Energy Branches of Current Loop Proportional Control Link $V_{P2}$ the compensation voltage $\Delta u_{dc1}$ corresponding to negative damping energy $W_{P2}$ in this branch can be expressed as follows:

$$\Delta u_{dc1} = -k_{p2} i_{dc}^* \quad (25)$$

(2) The Supplementary Energy Branches of Current Loop Integral Control Link $V_{I1}$ the compensation voltage $\Delta u_{dc2}$ corresponding to negative damping energy $W_{I1}$ in this branch can be expressed as follows:

$$\Delta u_{dc2} = -k_{i2} \int i_{dc}^* dt \quad (26)$$

(3) The Supplementary Energy Branches of dq Axis Cross Coupling Control Link $V_{L1}$ the compensation voltage $\Delta u_{dc3}$ and $\Delta u_{qc3}$ corresponding to negative damping energy $W_{L1}$ in this branch can be expressed as follows:

$$\begin{cases} \Delta u_{dc3} = -w_2 L_2 i_{dc} \Delta \theta_{pll} \\ \Delta u_{qc3} = -w_2 L_2 i_{qc} \Delta \theta_{pll} \end{cases} \quad (27)$$

Figure 3:
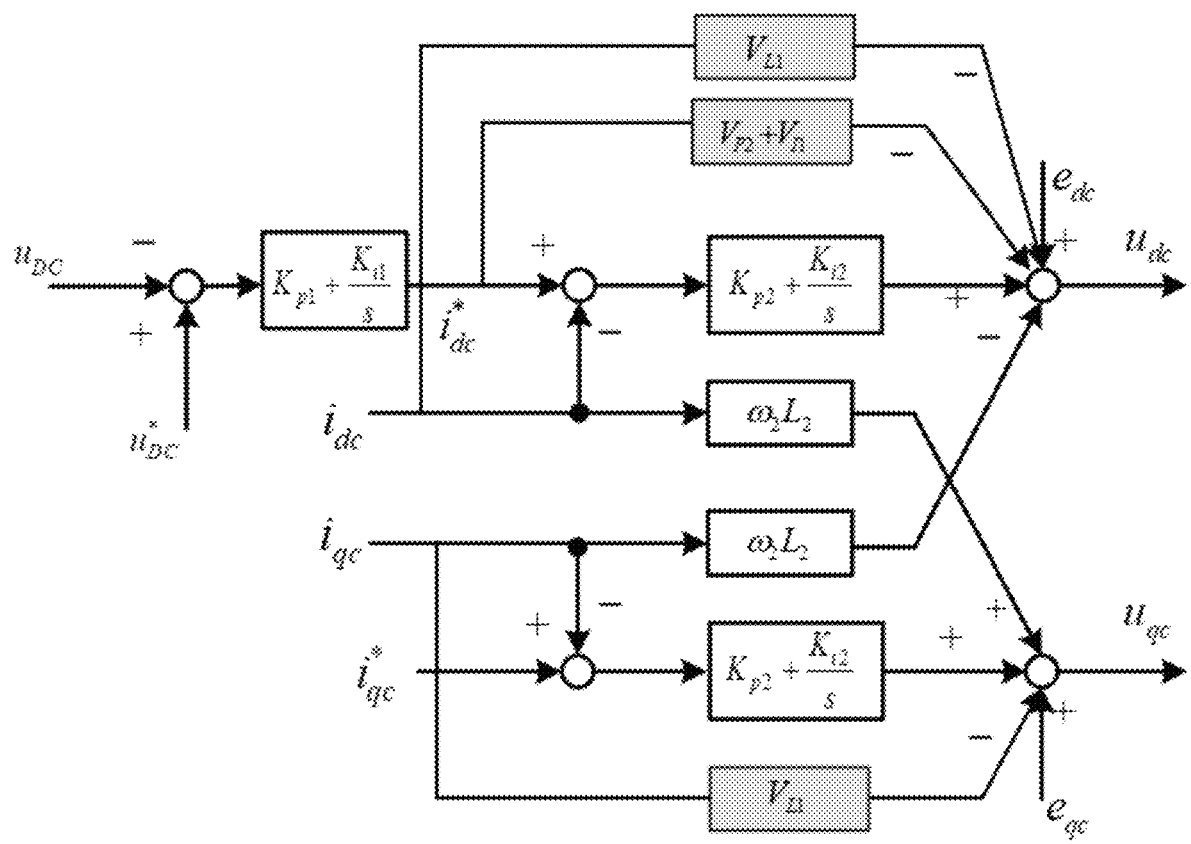
FIG. 3 is a schematic diagram of the supplementary energy branches in the first embodiment of the present disclosure.

FIG. 3 is a schematic diagram of the supplementary energy branches, wherein the supplementary energy branch of current loop proportional control link $V_{P2}$, the input term is $i_{dc}^*$, the proportional link with the compensation coefficient $k_{V1}$ is constructed to act on the d-axis output voltage of grid-side converter control links of direct-drive wind turbine; wherein the supplementary energy branch of current loop integral control link $V_{I1}$, the input term is $i_{dc}^*$, the integral link with the compensation coefficient $k_{V2}$ is constructed to act on the d-axis output voltage of grid-side converter control links of direct-drive wind turbine; wherein the supplementary energy branch of dq axis cross coupling control link $V_{L1}$, the input term is $i_{dc}$, the proportion link with the compensation coefficient $k_{V3}$ is constructed to act on the d-axis output voltage of grid-side converter control links of direct-drive wind turbine, the input term is $i_{qc}$, the proportion link with the compensation coefficient $k_{V3}$ is constructed to act on the q-axis output voltage of grid-side converter control links of direct-drive wind turbine.

The compensation energy $W_{V1}$, $W_{V2}$ and $W_{V3}$ of supplementary energy branches $V_{P2}$, $V_{I1}$ and $V_{L1}$ are expressed as:

$$W_{V1} = k_{p2} \int i_{dc}^* i_{dc} d\Delta \theta_{pll} \quad (28)$$

$$W_{V2} = k_{i2} \int i_{dc}^* i_{dc} d\Delta \theta_{pll} \quad (29)$$

$$W_{V3} = \omega_2 L_2 \int (i_{dc}^2 + i_{qc}^2) \Delta \theta_{pll} d\Delta \theta_{pll} \quad (30).$$

The increment of fundamental-frequency voltage $\Delta u_{dc1}^*$, $\Delta u_{dc2}^*$, $\Delta u_{dc3}^*$ and $\Delta u_{qc3}^*$ of supplementary energy branches $V_{P2}$, $V_{I1}$ and $V_{L1}$ are expressed as:

$$\Delta u_{dc1}^* = -k_{p2} i_{dc}^* \quad (31)$$

$$\Delta u_{dc2}^* = -k_{i2} \int i_{dc}^* dt \quad (32)$$

$$\begin{cases} \Delta u_{dc3}^* = 0 \\ \Delta u_{qc3}^* = 0 \end{cases} \quad (33)$$

Step S3: with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and enabling the supplementary energy branches after the compensation coefficients are determined.

Specifically, the objective function is $$\max f = \frac{\left|\sum_{i=1}^{n} k_{Vi} W_{Vi}\right|}{\left|\sum_{i=1}^{n} k_{Vi} \Delta u_{d(q)ci}^*\right|} \quad (34)$$

where $k_{vi}$ is the compensation coefficient of the ith supplementary energy branch; $W_{vi}$ is the compensation energy of the ith supplementary energy branch; $\Delta u_{d(q)ci}^*$ is the increment of d/q-axis fundamental-frequency voltage of the ith supplementary energy branch; n is the total number of supplementary energy branches, in this embodiment n=3.

The constraint of the frequency-domain characteristic of control links is $$\begin{cases} k_{V1} = \dfrac{1 - L_2 \omega_{Plc}^2 \left(\sqrt{1+4\xi_t^4} - 2\xi_t^2\right)}{k_{p2}} \\[2mm] k_{V2} = \dfrac{1 - 2L_2 \omega_{Plc} \left(\sqrt{\sqrt{1+4\xi_t^4} - 2\xi_t^2}\right)}{k_{i2}} \\[2mm] k_{V3} = \dfrac{\omega L_c}{w_2 \Delta \theta_{pll}} \end{cases} \quad (35)$$

$$\begin{cases} k_{V1} \in [k_{V1min}, k_{V1max}] \\ k_{V2} \in [k_{V2min}, k_{V2max}] \\ k_{V3} \in [k_{V3min}, k_{V3max}] \end{cases} \quad (36)$$

where $k_{V1}$, $k_{V2}$ and $k_{V3}$ are the compensation coefficients of the supplementary energy branches $V_{P2}$, $V_{I1}$ and $V_{L1}$; $\xi_t$ is the damping ratio of supplementary branches $V_{P2}$ and $V_{l1}$; $\omega_{PIc}=2\pi*f_{PIc}$, $f_{PIc}$ is the control bandwidth of supplementary branches $V_{P2}$ and $V_{L1}$; $\omega_{Lc}=2\pi*f_{Lc}$, $f_{Lc}$ is the control bandwidth of supplementary branch $V_{L1}$; to ensure the speed and smoothness of supplementary branches, the damping ratio usually satisfies: $0.4 \leq \xi_i \leq 0.8$. Meanwhile, consider that the dangerous frequency bands where sub/super-synchronous oscillation may occur when direct-drive wind turbine is integrated to weak power grid are 20 Hz-30 Hz and 70 Hz-80 Hz, $f_{PIc}$ and $f_{Lc}$ can be set as: $20 \leq f_{PIc}$, $f_{Lc} \leq 30$, $70 \leq f_{PIc}$, $f_{Lc} \leq 80$; according to the value ranges of damping ratio and control bandwidth, the parameter intervals of compensation coefficients can be determined: $k_{V1min}$ and $k_{V1max}$ are the minimum and maximum value of the compensation coefficient of the supplementary energy branches $V_{P2}$; $k_{V2min}$ and $k_{V2max}$ are the minimum and maximum value of the compensation coefficient of the supplementary energy branches $V_{l1}$; $k_{V3min}$ and $k_{V3max}$ are the minimum and maximum value of the compensation coefficient of the supplementary energy branches $V_{L1}$.

The constraint of fundamental-frequency voltage characteristic of control links is $$\sqrt{\sum_{i=1}^{n}(k_{Vi}\Delta u^*_{d(q)ci})^2} \leq 5\% \ U_n \quad (37)$$

where $U_n$ is the rated voltage at the terminal of direct-drive wind turbine, the per unit value of which is 1.

Preferably, the pattern search method is used to determine the compensation coefficients of supplementary branches, which comprises the following steps:

step S301: measure the data of voltage and current at the terminal of direct-drive wind turbine online, and calculate the compensation energy of each supplementary branch; calculate the increment of fundamental-frequency voltage brought by each supplementary branch; and determine the parameter interval of each compensation coefficient;

step S302: set the initial values of compensation coefficients $k_{V1}$, $k_{V2}$ and $k_{V3}$; if certain group of compensation coefficients $x_1$ satisfies the constraints, $x_1$ is a feasible solution, i.e. the current optimal solution; otherwise, set new initial values until any feasible solution is found;

step S303: based on the current optimal solution $x_i$ (i=1, 2, 3 . . . ), use the pattern search method to update the compensation coefficients; for new feasible solution $x_{i+1}$ that satisfies the constraints, calculate the objective function; $f_{i+1} > f_i$, $x_{i+1}$ is the current optimal solution; otherwise, repeat step S303; and step S304: repeat the search process until the number of iterations is satisfied; the current optimal solution is the optimal compensation coefficients.

The Second Embodiment

Figure 4:
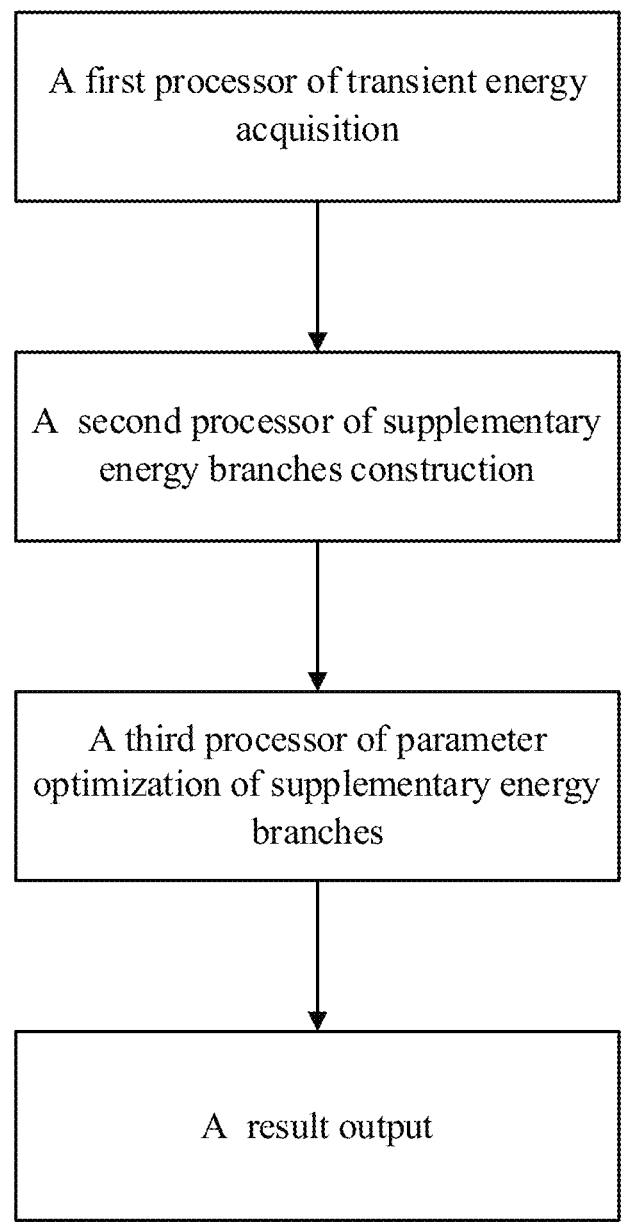
FIG. 4 is a structure diagram of a system of suppressing sub/super-synchronous oscillation for direct-drive wind turbine based on energy compensation in the second embodiment of the present disclosure.

This embodiment proposes a system for suppressing sub/super-synchronous oscillation for direct-drive wind turbine based on energy compensation. Because the system for suppressing sub/super-synchronous oscillation for direct-drive wind turbine based on energy compensation adopts the same inventive concept as the aforementioned method, only the structure of this system will be described below. For the technical effects and technical problems solved by its specific disclosure, please refer to the previous statement. As shown in FIG. 4, the system for suppressing sub/super-synchronous oscillation for direct-drive wind turbine based on energy compensation including: a first processor of transient energy acquisition, used to real-time collect the bus voltage and the node injection current of the wind turbine and obtain the transient energy of direct-drive wind turbine; a second processor of supplementary energy branches construction, used to collect the dynamic angle of PLL when the variation rate of the transient energy of direct-drive wind turbine is positive and calculate the compensation energy and the increments of fundamental-frequency voltage of several supplementary energy branches based on the bus voltage and the node injection current of the wind turbine and the dynamic angle of PLL; a third processor of the parameter optimization of supplementary energy branches, used to determine the compensation coefficients of supplementary energy branches with the compensation energy of supplementary branches reaching the maximum and the increment of fundamental-frequency voltage being the minimum as the objective and with the frequency-domain characteristic and fundamental-frequency voltage characteristic of control links being satisfied as the constraints; and a result output, used to enable the supplementary energy branches after the compensation coefficients are determined.

Each of the first processor, the second processor and the third processor is independent processor, or all of them are integrated in a single processor.

Based on the same principle, the above method of the first embodiment and system of this embodiment can learn from each other and achieve the same technical effect.

The Third Embodiment

This embodiment proposes a storage medium encoded with a set of machine-executable instructions to perform a method for suppressing sub/super-synchronous oscillation for direct-drive wind turbine based on energy compensation. The method comprises:

real-time collecting the bus voltage and the node injection current of the wind turbine, obtaining the transient energy of direct-drive wind turbine;

collecting the dynamic angle of PLL when the variation rate of the transient energy of direct-drive wind turbine is positive, calculating the compensation energy and the increments of fundamental-frequency voltage of several supplementary energy branches based on the bus voltage and the node injection current of the wind turbine and the dynamic angle of PLL; and with the compensation energy of supplementary branches reaching the maximum and the increment of fundamental-frequency voltage being the minimum as the objective, and with the frequency-domain characteristic and fundamental-frequency voltage characteristic of control links being satisfied as the constraints, determining the compensation coefficients of supplementary energy branches, and enabling the supplementary energy branches after the compensation coefficients are determined.

The Fourth Embodiment

Figure 5:
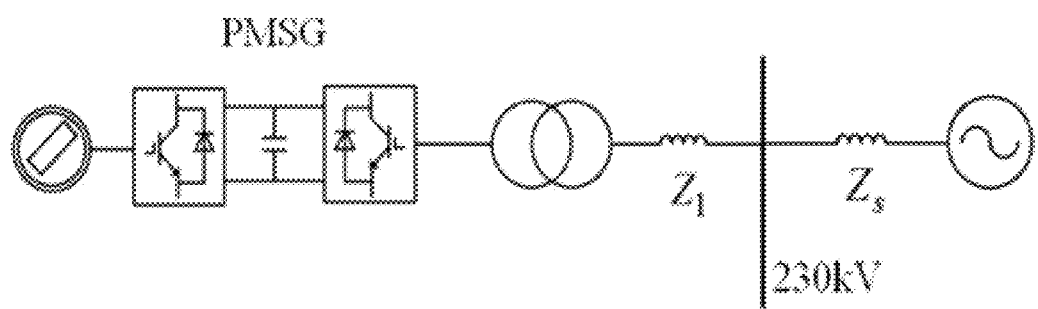
FIG. 5 is a schematic diagram of the power system integrated with direct-drive wind turbines in the third embodiment of the present disclosure.

The specific fourth embodiment of the disclosure discloses a specific implementation process of a method for suppressing sub/super-synchronous oscillation for direct-drive wind turbine based on energy compensation. A model of power system integrated with direct-drive wind turbines is built in RTLAB for simulation tests, as shown in FIG. 5. Direct-drive wind turbines are collected to the bus via 0.69/20 kV field transformer and then connected to PCC (point of common coupling) via 20/230 kV transformer. The rated active power of PMSG is 1 MW, and its main parameters are as follows: the rated frequency is 50 Hz, the rated stator voltage is 0.69 kV, the stator resistance is 0.0011 p.u., the stator reactance is 0.0005 p.u., the flux linkage of the permanent magnet is 5.43 Wb, the rotational inertia is 100 kg·m², the polar logarithm is 100. The rated line voltage of grid-side converter is 0.4 kV, the DC voltage is 1.2 kV, the proportional coefficient $k_{p2}$ and integral coefficient $k_{i2}$ of current inner loop are 0.0005 and 0.1238, the proportional coefficient $k_{p\theta}$ and integral coefficient $k_{i\theta}$ of PLL are 0.67 and 38.2.

To verify the correctness and effectiveness of the proposed method, different sub/super-synchronous oscillation cases with different power grid strengths are set in this embodiment, i.e. diverging oscillation (Case 1), constant-amplitude oscillation (Case 2) and converging oscillation (Case 3). Concerning the three cases, the variation of transient energy of different control links in grid-side converter and the suppression effect of supplementary energy branches are analyzed.

1) Transient Energy of Different Control Links in Grid-Side Converter

Figure 6:
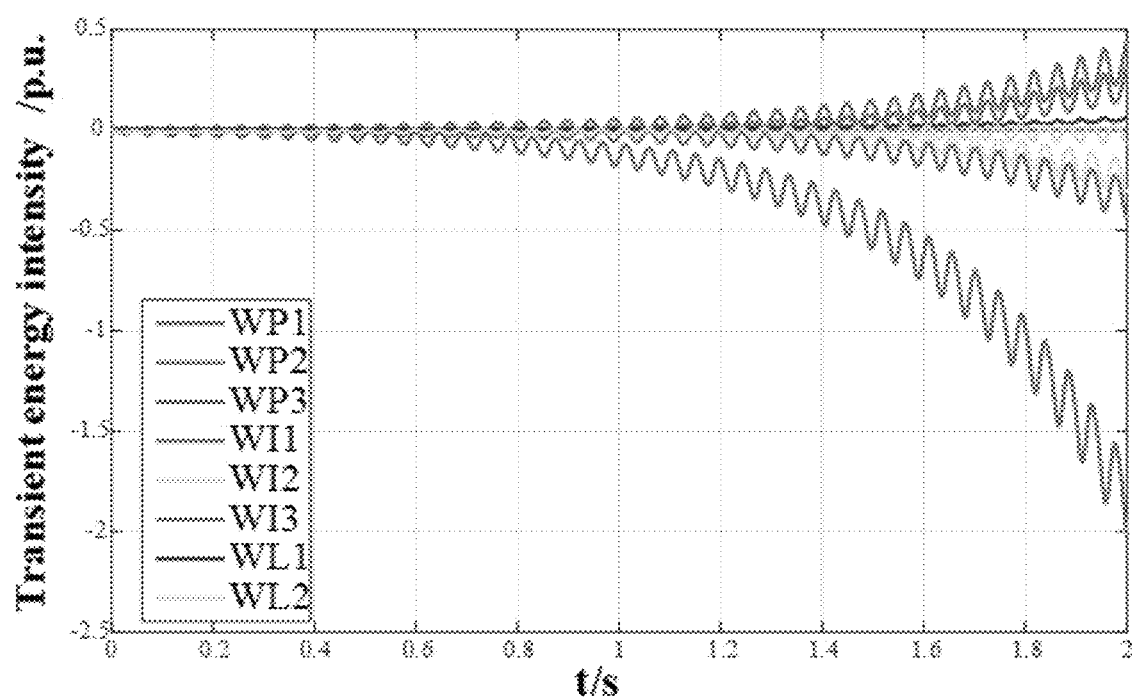
FIG. 6 is a schematic diagram of the transient energy of different control links in grid-side converter in Case 1 in the third embodiment of the present disclosure.
Figure 7:
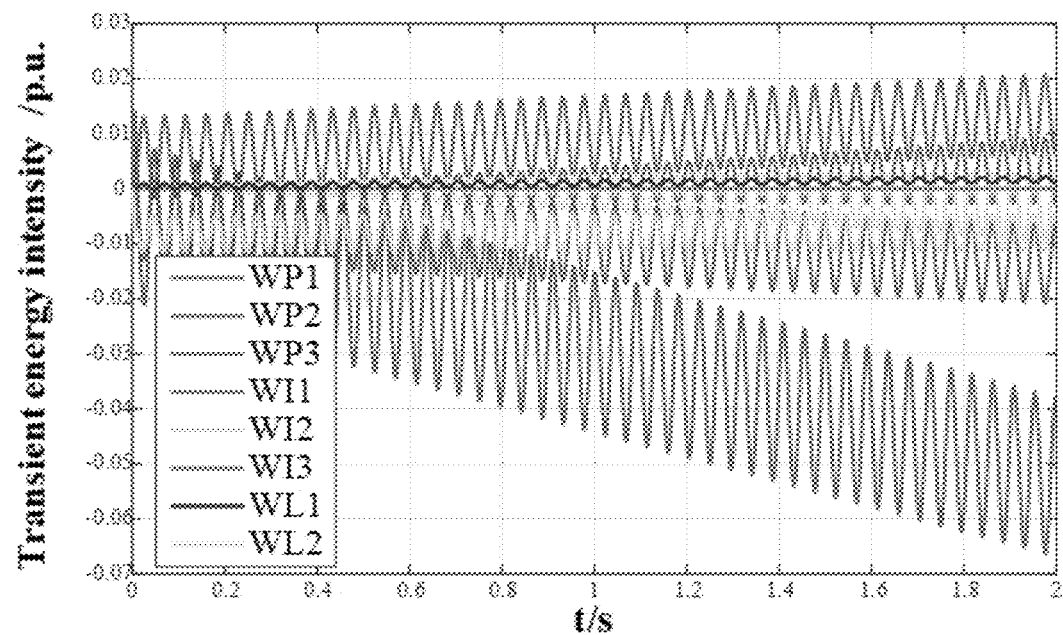
FIG. 7 is a schematic diagram of the transient energy of different control links in grid-side converter in Case 2 in the third embodiment of the present disclosure.
Figure 8:
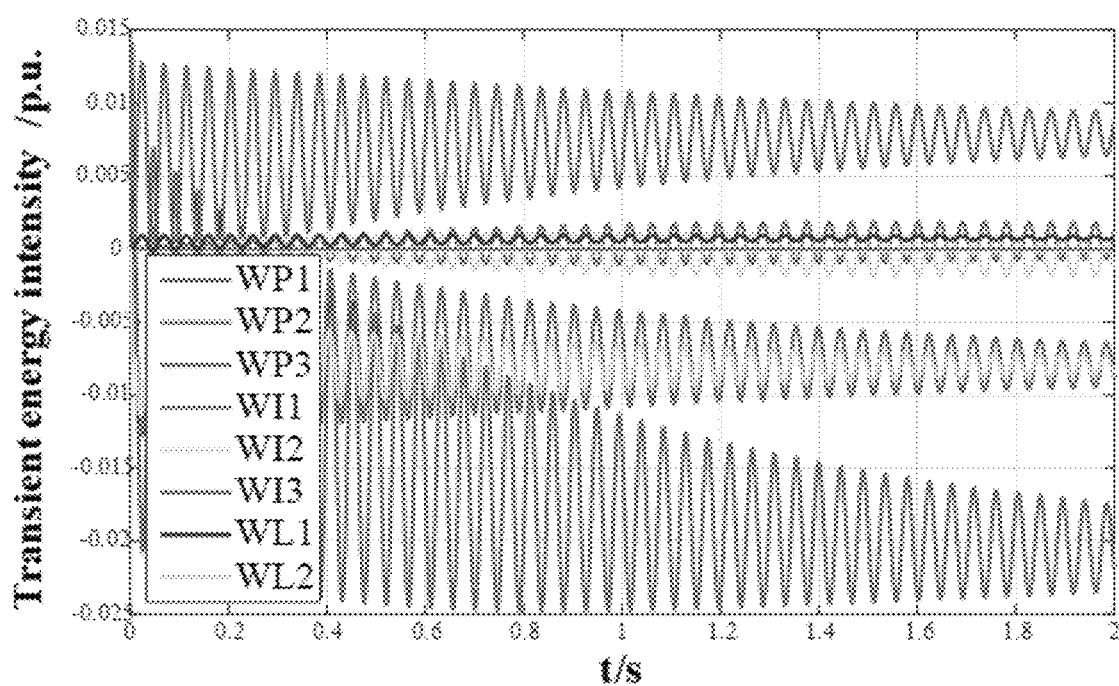
FIG. 8 is a schematic diagram of the transient energy of different control links in grid-side converter in Case 3 in the third embodiment of the present disclosure.

The transient energy of different control links in grid-side converter in Case 1, Case 2 and Case 3 is calculated (per unit values of variables are used in the calculation). The simulation curves of transient energy are shown in FIG. 6, FIG. 7 and FIG. 8. It can be seen from FIGS. 6-8 that, in Case 1, Case 2 and Case 3, $W_{P1}$, $W_{P3}$, $W_{I2}$ and $W_{L2}$ are all negative, so are their variation rates, thus the corresponding control links exhibit positive damping characteristic, i.e. they keep absorbing transient energy, which makes for the stability of system. $W_{P2}$, $W_{I1}$, $W_{I3}$ and $W_{L1}$ are all positive, so are their variation rates, thus the corresponding control links exhibit negative damping characteristic, i.e. they keep generating transient energy, causing the system to go unstable. The amplitude of $W_{P1}$ is the largest, the amplitudes of $W_{P2}$, $W_{P3}$ and $W_{L2}$ are relatively large but all smaller than $W_{P1}$, while the amplitudes of $W_{I1}$, $W_{I2}$, $W_{L1}$ and $W_{I3}$ are relatively small but all smaller than $W_{p1}$, and the amplitude of $W_{I3}$ is the smallest, next to 0. During sub/super-synchronous oscillation, $W_{P2}$, $W_{I1}$ and $W_{L1}$ are the negative damping energy terms that lead the oscillation of direct-drive wind turbine. Thus, the corresponding d-axis current loop control link and d-axis and q-axis cross-coupled control links have leading effect on system oscillation, while q-axis current loop control link scarcely affects the oscillation.

2) Suppression Effect of Supplementary Energy Branches

Figure 9:
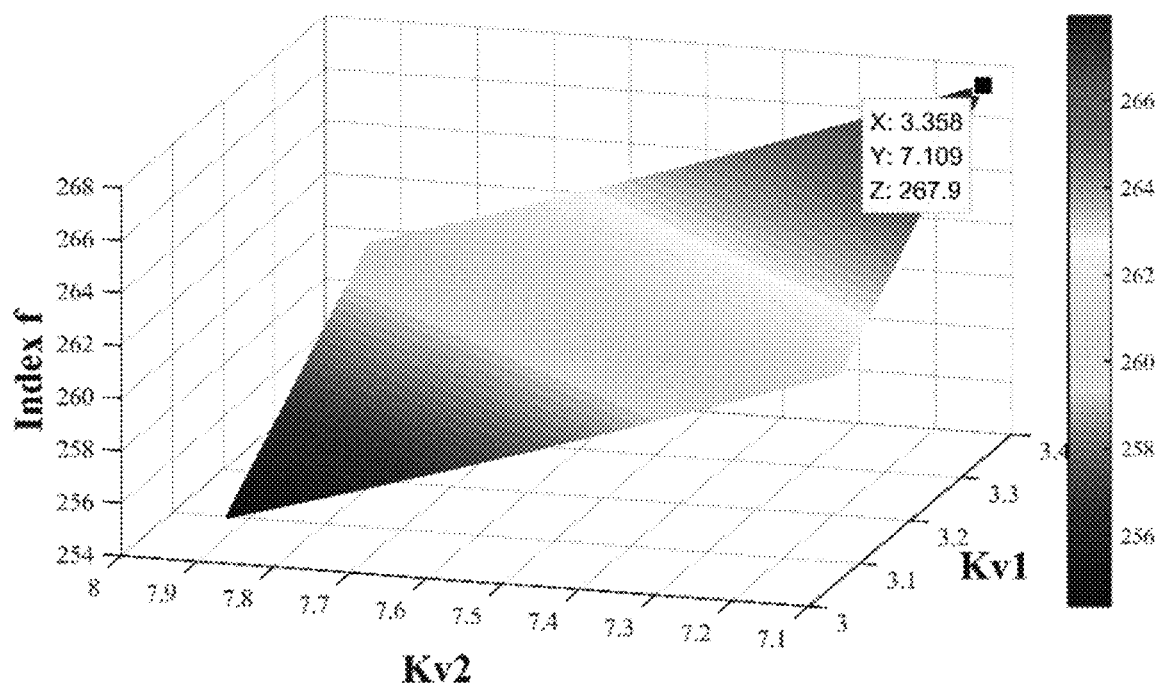
FIG. 9 is a schematic diagram of the optimization process of compensation coefficients of supplementary energy branches in Case 1 in the third embodiment of the present disclosure.

Construct supplementary energy branches according to the method proposed in step S2 in the first embodiment, and combining the simulation data of Case 1, the model to optimize the compensation coefficients of multiple branches is built according to the method for suppressing sub/super-synchronous oscillation for direct-drive wind turbine in step S3 in the first embodiment. And then the pattern search method is used to determine the optimal compensation coefficients. Since supplementary branch $V_{L1}$ does not generate any increment of fundamental-frequency voltage, its compensation coefficient $k_{V3}$ is set to render its compensation energy the maximum, i.e. $k_{V3}$ applies the maximum value in the parameter interval. Optimization of compensation coefficients of supplementary branches $V_{P2}$ and $V_{I1}$ is shown in FIG. 9. It can be seen that, the bigger $k_{V1}$ is and the smaller $k_{V2}$ is, the bigger the ratio of compensation energy to increment of fundamental-frequency voltage is, and the better compatible supplementary energy branches are with compensation capability and impact on fundamental frequency characteristic. Therefore, the optimal compensation coefficients are designed as: $k_{V1}$=3.358, $k_{V2}$=7.109 and $k_{V3}$=0.0769.

To verify the effectiveness of the proposed supplementary energy branches, the suppression effects of supplementary energy branches corresponding to different grid strengths and different oscillation frequencies are analyzed. Besides, the impact of supplementary energy branches on the fundamental frequency characteristic of wind turbine is verified.

Figure 10:
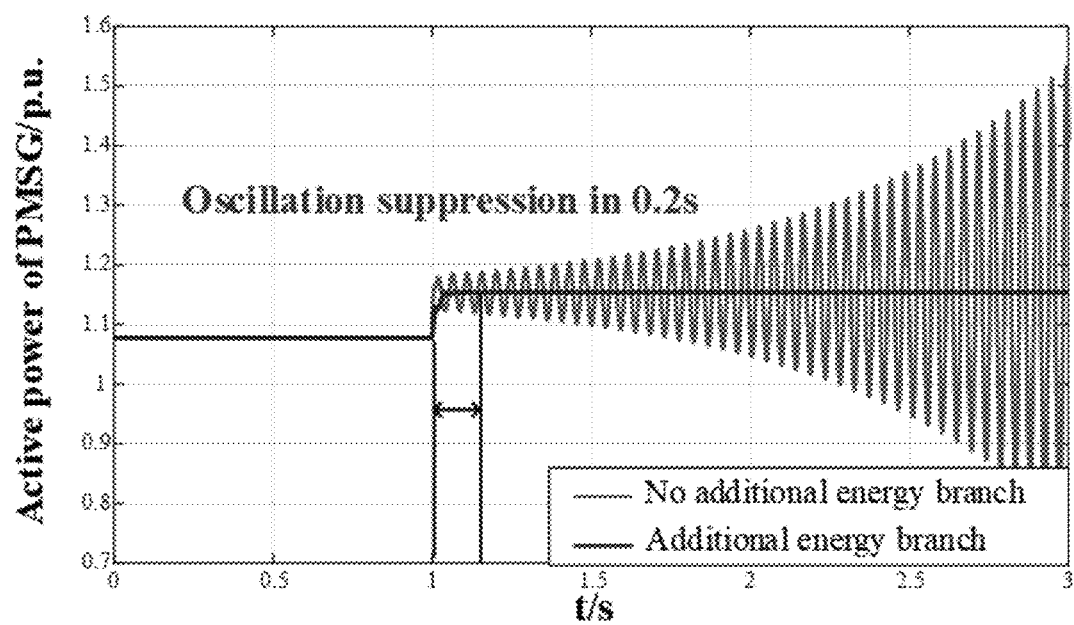
FIG. 10 is a diagram of the variation of active power after supplementary energy branches are added in Case 1 in the third embodiment of the present disclosure.
Figure 11:
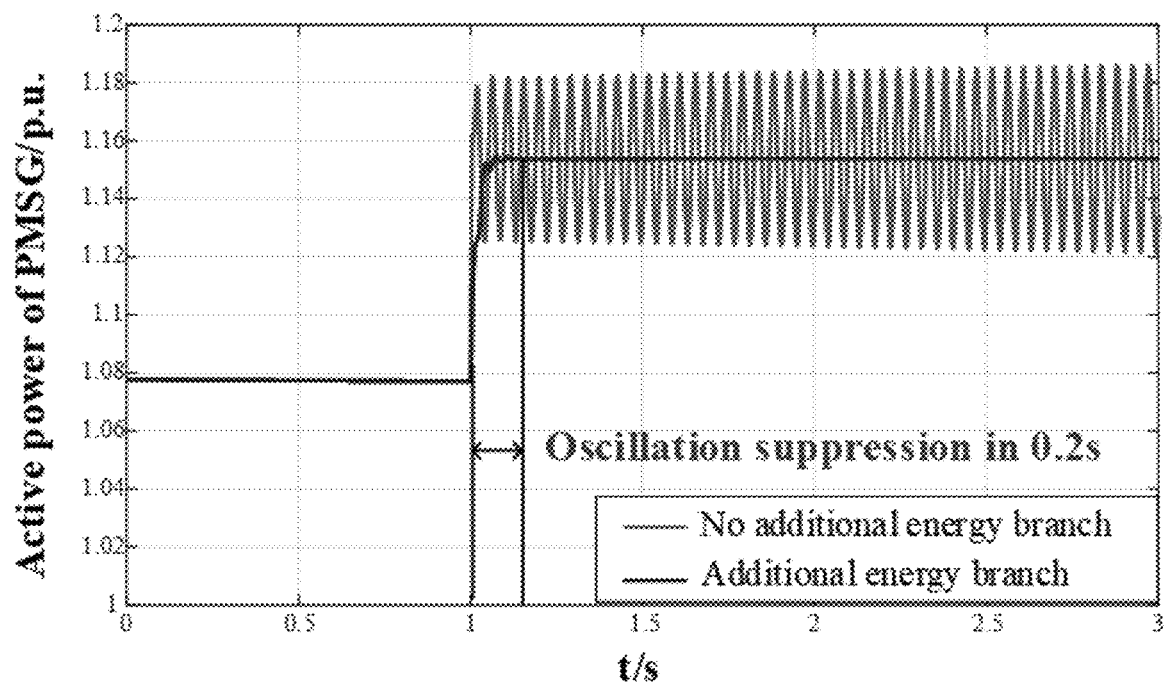
FIG. 11 is a diagram of the variation of active power after supplementary energy branches are added in Case 2 in the third embodiment of the present disclosure.
Figure 12:
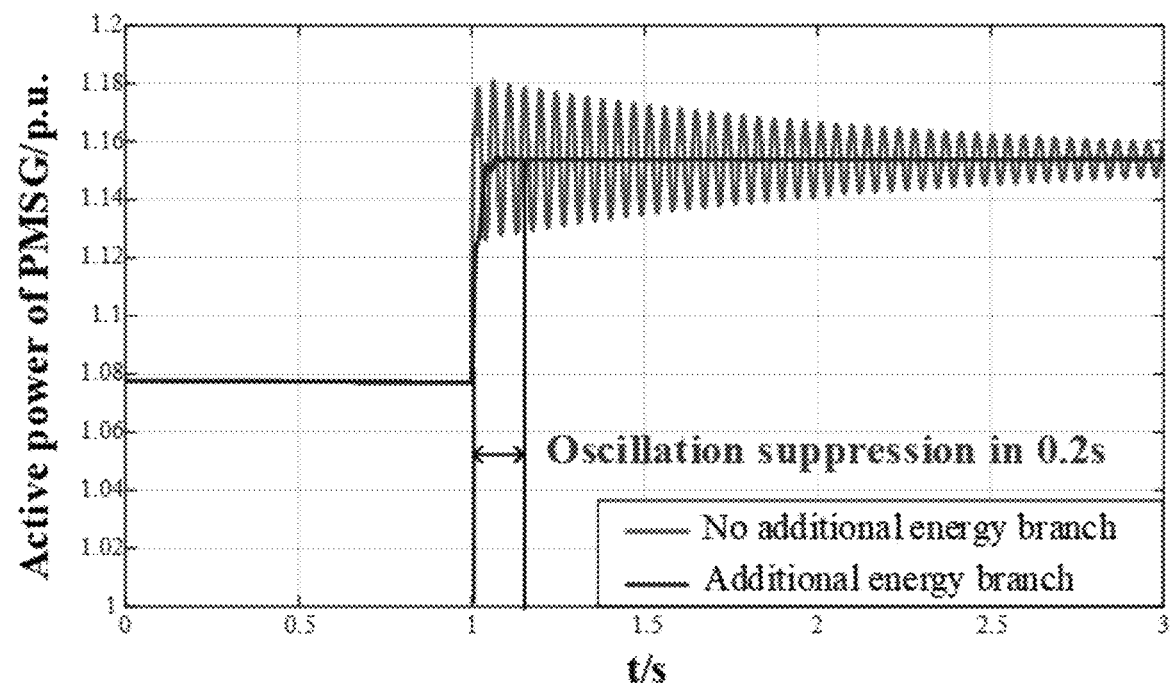
FIG. 12 is a diagram of the variation of active power after supplementary energy branches are added in Case 3 in the third embodiment of the present disclosure.
Figure 13:
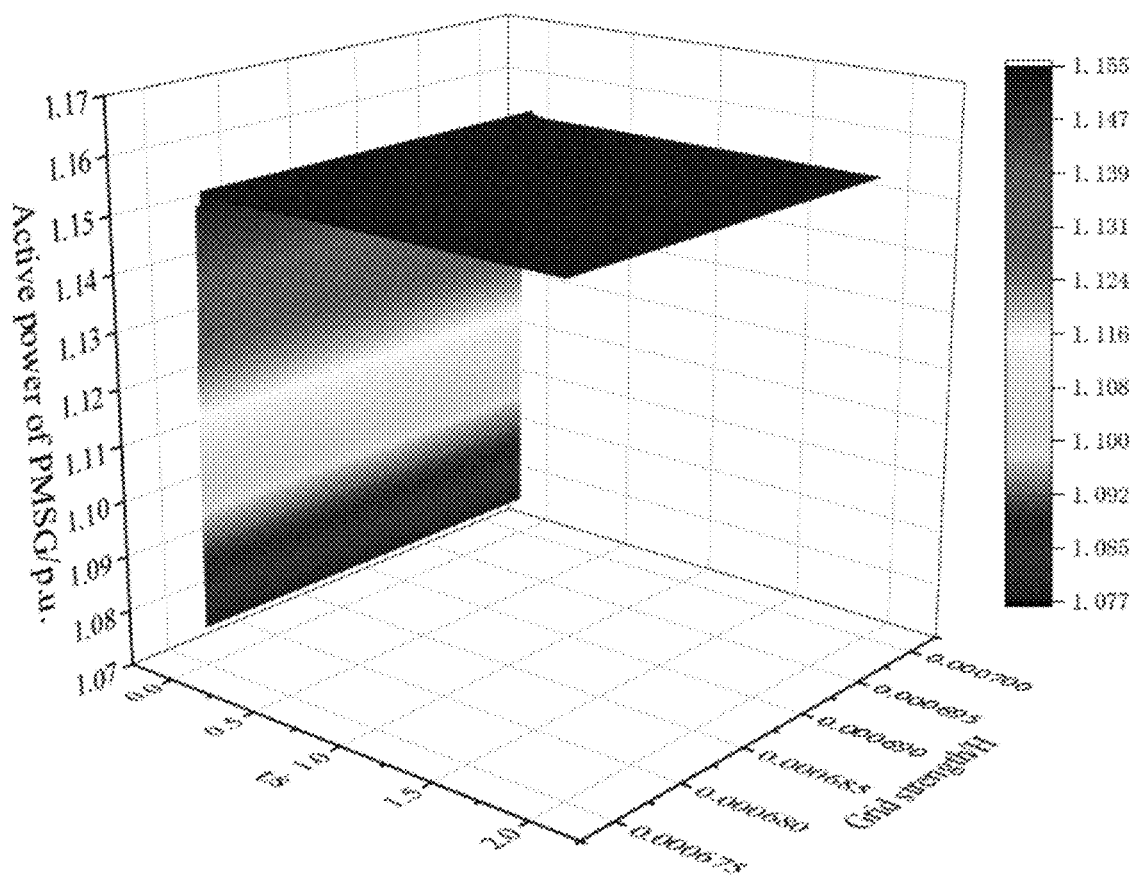
FIG. 13 is a three-dimensional diagram of the variation of active power after supplementary energy branches are added corresponding to different grid strengths in the third embodiment of the present disclosure.

(1) Suppression Effects of Supplementary Energy Branches Corresponding to Different Grid Strengths Suppose the optimal supplementary energy branches are added in Case 1, Case 2 and Case 3, and the variation curves of output power of direct-drive wind turbine are shown in FIGS. 10-12. By regulating the parameters of power grid, the suppression effects of supplementary energy branches corresponding to different grid strengths can be obtained, shown in FIG. 13. It can be seen from FIGS. 10-12 that, after supplementary energy branches are added in Case 1, Case 2 and Case 3, the oscillation amplitude of output power of direct-drive wind turbine immediately drops, and the oscillation converges to stable state within 0.2 s. According to FIG. 13, for different grid strengths, the dropping degree and converging trend of oscillation amplitude are almost the same, and the oscillation can all be effectively suppressed within 0.2 s.

Figure 14:
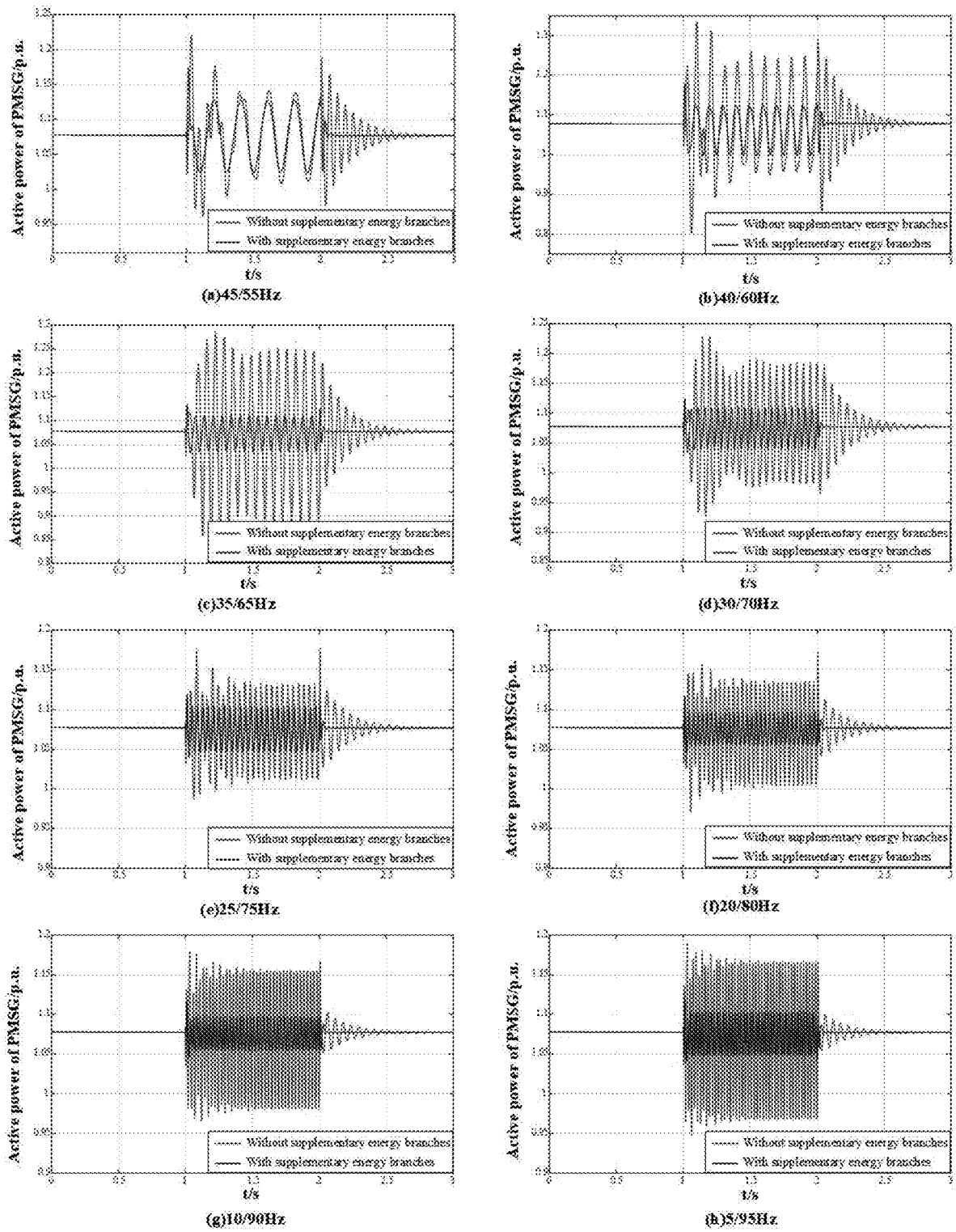
FIG. 14 is a diagram of the suppression effects of supplementary energy branches corresponding to different oscillation frequencies in the third embodiment of the present disclosure.

(2) Suppression Effects of Supplementary Energy Branches Corresponding to Different Oscillation Frequencies The oscillation in Case 1, Case 2 and Case 3 are all sub/super-synchronous oscillation with frequency of 28/72 Hz, where the supplementary energy branches have relatively good suppression effect. To verify the adaptability of supplementary energy branches to different oscillation frequency bands, forced oscillation is used. Suppose 5 Hz-100 Hz harmonic current is injected to the grid which causes oscillation to occur in the system, and the suppression effect of supplementary energy branches is shown in FIG. 14.

It can be seen from FIGS. 14(a) and (b) that, grid-side injected harmonic current causes forced oscillation to occur in the system at t=1 s. When the forced oscillation is in 40 Hz-60 Hz frequency band, which does not belong to the range of sub/super-synchronous frequency, the output power of direct-drive wind turbine has no obvious variation after supplementary branches are added, i.e. supplementary energy branches basically have no suppression effect in this frequency band. According to FIG. 14(c)-(h), when the forced oscillation is in 5 Hz-40 Hz or 60 Hz-95 Hz frequency bands, the oscillation amplitude of output power obviously drops after supplementary energy branches are added, i.e. the suppression effect of supplementary energy branches is relatively good in these frequency bands. However, due to the existence of external disturbance, the oscillation of wind turbine cannot converge. If the injected current is removed, the oscillation will converge rapidly. Besides, the bigger the difference between oscillation frequency and fundamental frequency is (i.e. the higher super-synchronous frequency is or the lower sub-synchronous frequency is), the larger the negative damping energy compensated by supplementary branches is, and the more obvious the oscillation suppression effect is.

Figure 15:
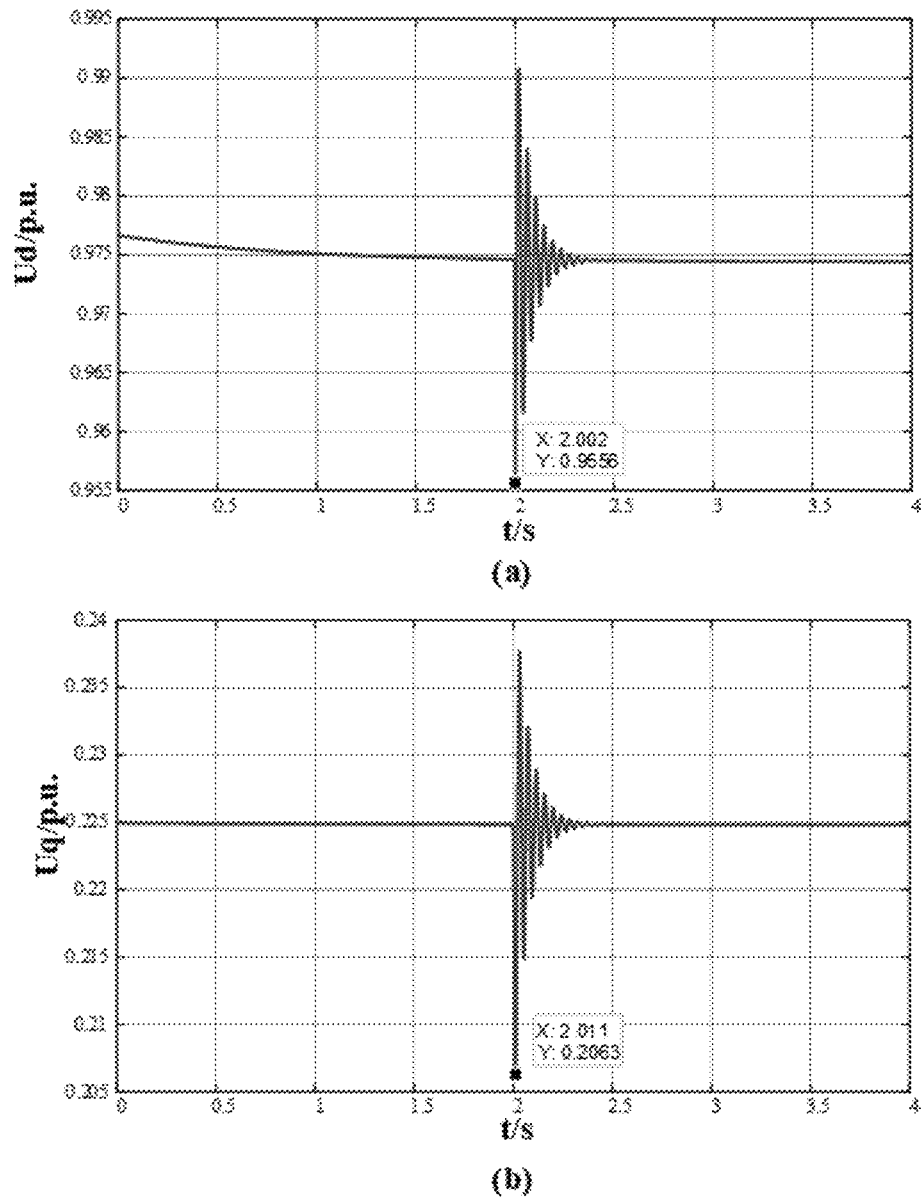
FIG. 15 is a diagram of the variation curves of fundamental-frequency voltage of wind turbine after supplementary energy branches are added in the third embodiment of the present disclosure.
Figure 16:
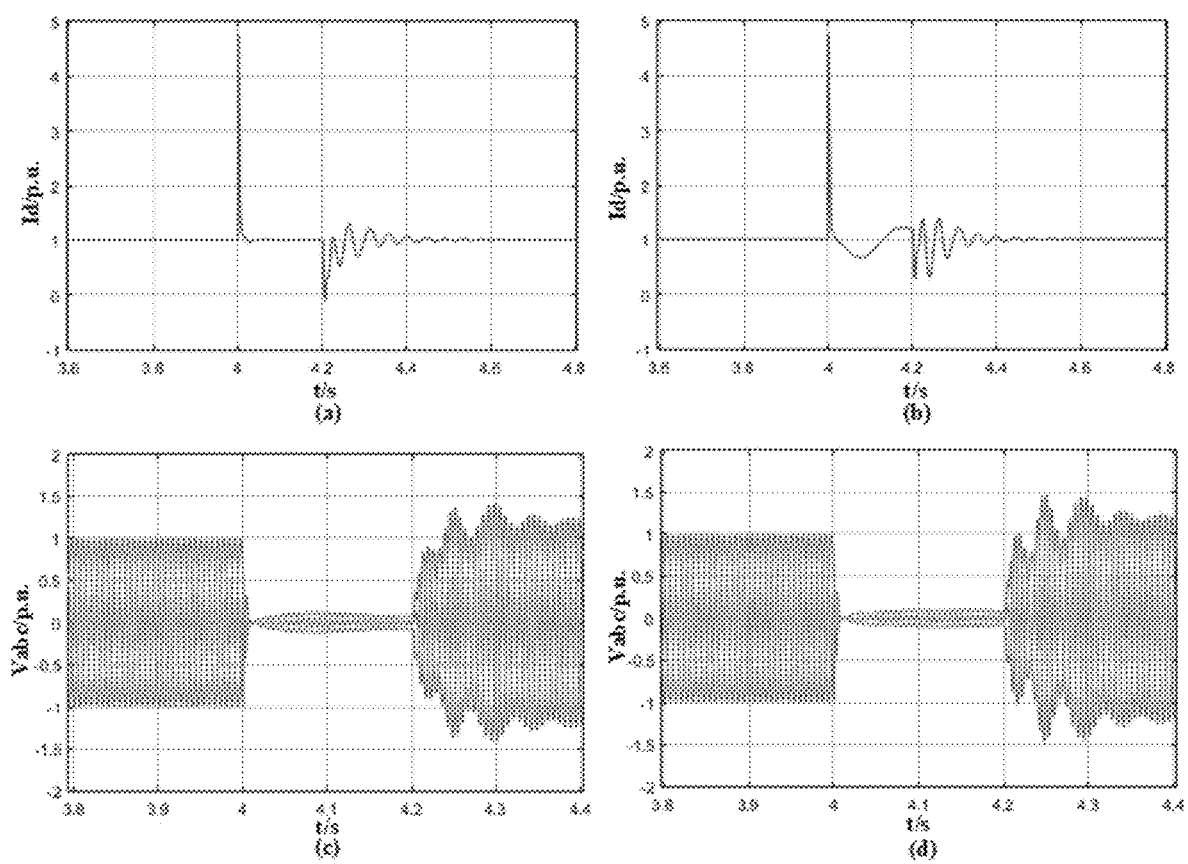
FIG. 16 is a diagram of the variation curves of current and voltage of wind turbine after supplementary energy branches are added during LVRT in the third embodiment of the present disclosure.

(3) Impact of Supplementary Energy Branches on Fundamental Frequency Characteristic of Direct-Drive Wind Turbine Furthermore, the impact of supplementary energy branches on the fundamental frequency characteristic of direct-drive wind turbine is analyzed. Suppose supplementary energy branches are added at certain moment in normal operation state, the variation of fundamental-frequency voltage of wind turbine is shown in FIG. 15. FIGS. 15(a) and (b) are respectively the variation curves of d-axis voltage and q-axis voltage. On this basis, LVRT (Low Voltage Ride Through) simulation case is set to verify the compatibility of supplementary energy branches with fundamental frequency response of wind turbine. The variation curves of output current and voltage of wind turbine during LVRT are shown in FIG. 16. FIGS. 16(a) and (c) are simulation results without supplementary energy branches. FIGS. 16(b) and (d) are simulation results with supplementary energy branches.

It can be seen from FIGS. 15(a) and (b) that, after supplementary energy branches are added, the output voltage of direct-drive wind turbine fluctuates, but the maximum fluctuation amplitude is only 0.02 p.u, thus the constraints of fundamental-frequency voltage are still satisfied, i.e. the impact of supplementary branches on normal operation of direct-drive wind turbine is relatively small. It can be seen from FIGS. 16(a) and (b) that, when supplementary energy branches are added, the variation amplitude of current of wind turbine during LVRT is relatively small, thus system operation is not affected. According to FIGS. 16(c) and (d), when supplementary energy branches are added, the voltage of wind turbine scarcely changes, thus the LVRT characteristic of wind turbine is not affected. Therefore, the proposed supplementary energy branches are proved to be compatible with fundamental frequency dynamic response of wind turbine.

It can be understood by those skilled in the art that the whole or part of the process of realizing the above embodiment method can be completed by instructing the relevant hardware through a computer program, and the program can be stored in a computer-readable storage medium. The computer-readable storage medium is a disk, an optical disk, a read-only memory or a random storage memory, etc.

The above are only preferred specific embodiments of the present disclosure, but the scope of protection of the present disclosure is not limited to this, any person skilled in the art can easily think of changes or replacement changes within the technical scope disclosed by the present disclosure should be covered within the protection scope of the present disclosure.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical disclosure, to thereby enable others skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. A method for suppressing sub-synchronous and super-synchronous oscillations for direct-drive wind turbine based on energy compensation comprising:
   step S1: real-time collecting bus voltage and node injection current of the direct-drive wind turbine by a voltage transformer and a current transformer, obtaining transient energy of the direct-drive wind turbine;
   step S2: collecting dynamic angle of phase locked loop (PLL) by a direct-drive wind turbine grid-side converter when variation rate of the transient energy of the direct-drive wind turbine is positive, calculating compensation energy and increments of fundamental-frequency voltage of supplementary energy branches based on the bus voltage, the node injection current of the direct-drive wind turbine, and the dynamic angle of PLL; and
   step S3: determining compensation coefficients of the supplementary energy branches according to objective function and constraints, and introducing the supplementary energy branches to achieve stable operation of the wind power grid-connected system after the compensation coefficients are determined, wherein in the objective function, the compensation energy of the supplementary energy branches reaching maximum and the increment of fundamental-frequency voltage of the supplementary energy branches being, and for the constraints, frequency-domain characteristic and fundamental-frequency voltage characteristic of control links being satisfied.

2. The method for suppressing sub-synchronous and super-synchronous oscillations for direct-drive wind turbine based on energy compensation according to claim 1, the supplementary energy branches in the step S2 comprise:
   the supplementary energy branches of current loop proportional control link, current loop integral control link and dq axis cross coupling control link.

3. The method for suppressing sub-synchronous and super-synchronous oscillations for direct-drive wind turbine based on energy compensation according to claim 2,
   wherein the supplementary energy branch of current loop proportional control link, the input term is $i_{dc}^*$, the proportional link with the compensation coefficient $k_{V1}$ is constructed to act on the d-axis output voltage of grid-side converter control links of direct-drive wind turbine;
   the compensation energy of supplementary energy branch of current loop proportional control link $W_{V1}$ is $$W_{V1} = k_{p2} \int i_{dc}^* i_{dc} d\Delta\theta_{pll} \qquad (1)$$

where $k_{p2}$ is proportion coefficient of current inner loop; $i_{dc}^*$ is d-axis reference value of current; $i_{dc}$ is respectively d-axis component of current at the terminal of direct-drive wind turbine; $\Delta\theta_{pll}$ represents the dynamic angle of PLL generated;
   the increment of fundamental-frequency voltage of supplementary energy branch of current loop proportional control link $\Delta u_{dc2}^*$ is $$\Delta u_{dc1}^* = -k_{p2} i_{dc}^* \qquad (2).$$

4. The method for suppressing sub-synchronous and super-synchronous oscillations for direct-drive wind turbine based on energy compensation according to claim 3, wherein the supplementary energy branch of current loop integral control link, the input term is $i_{dc}^*$, the integral link with the compensation coefficient $k_{V2}$ is constructed to act on the d-axis output voltage of grid-side converter control links of direct-drive wind turbine;

the compensation energy of supplementary energy branch of current loop integral control link $W_{V2}$ is $$W_{V2}=k_{i2}\int i_{dc}*i_{dc}\,td\Delta\theta_{pll} \tag{3}$$

where $k_{i2}$ is integral coefficient of current inner loop; t is the oscillation time;

the increment of fundamental-frequency voltage of supplementary energy branch of current loop integral control link $\Delta u_{dc2}*$ is $$\Delta u_{dc2}*=-k_{i2}\int i_{dc}*dt \tag{4}.$$

5. The method for suppressing sub-synchronous and super-synchronous oscillations for direct-drive wind turbine based on energy compensation according to claim 4,
  wherein the supplementary energy branch of dq axis cross coupling control link, the input term is $i_{dc}$, the proportion link with the compensation coefficient $k_{V3}$ is constructed to act on the d-axis output voltage of grid-side converter control links of direct-drive wind turbine, the input term is $i_{qc}$, the proportion link with the compensation coefficient $k_{V3}$ is constructed to act on the q-axis output voltage of grid-side converter control links of direct-drive wind turbine;
  the compensation energy of supplementary energy branch of dq axis cross coupling control link $W_{V3}$ is $$W_{V3}=\omega_2 L_2 \int (i_{dc}^2+i_{qc}^2)\Delta\theta_{pll}d\Delta\theta_{pll} \tag{5}$$

where $i_{qc}$ is respectively q-axis components of current at the terminal of direct-drive wind turbine; $\omega_2$ is the angular frequency of power grid; $L_2$ is the reactance of outlet line;

the increment of fundamental-frequency voltage of supplementary energy branch of dq axis cross coupling control link $\Delta u_{dc3}*$ and $\Delta u_{qc3}*$ are:

$$\begin{cases} \Delta u_{dc3}^* = 0 \\ \Delta u_{qc3}^* = 0 \end{cases} \tag{6}$$

6. The method for suppressing sub-synchronous and super-synchronous oscillations for direct-drive wind turbine based on energy compensation according to claim 5, wherein the step S3,
  the objective is $$\max f = \frac{\left|\sum_{i=1}^{n} k_{Vi} W_{Vi}\right|}{\left|\sum_{i=1}^{n} k_{Vi}\Delta u_{d(q)ci}^*\right|} \tag{7}$$

where $k_{Vi}$ is the compensation coefficient of the ith supplementary energy branch; $W_{Vi}$ is the compensation energy of the ith supplementary energy branch; $\Delta u_{d(q)ci}*$ is the increment of d/q-axis fundamental-frequency voltage of the ith supplementary energy branch; n is the total number of supplementary energy branches.

7. The method for suppressing sub-synchronous and super-synchronous oscillations for direct-drive wind turbine based on energy compensation according to claim 6, wherein,
  the constraint of the frequency-domain characteristic of control links is $$\begin{cases} k_{V1} = \dfrac{1-L_2\omega_{PIc}^2\left(\sqrt{1+4\xi_t^4}-2\xi_t^2\right)}{k_{p2}} \\ k_{V2} = \dfrac{1-2L_2\omega_{PIc}\left(\sqrt{\sqrt{1+4\xi_t^4}-2\xi_t^2}\right)}{k_{i2}} \\ k_{V3} = \dfrac{\omega_{Lc}}{w_2\Delta\theta_{pll}} \end{cases} \tag{8}$$

where $\xi_t$ is the damping ratio of supplementary branches of current loop proportional and integral control link; $\omega_{PIc}=2\pi*f_{PIc}$; $f_{PIc}$ is the control bandwidth of supplementary branches of current loop proportional and integral control link; $\omega_{Lc}=2\pi*f_{Lc}$; $f_{Lc}$ is the control bandwidth of supplementary branch of dq axis cross coupling control link.

8. The method for suppressing sub-synchronous and super-synchronous oscillations for direct-drive wind turbine based on energy compensation according to claim 7, wherein,
  the constraint of fundamental-frequency voltage characteristic of control links is $$\sqrt{\sum_{i=1}^{n}(k_{Vi}\Delta u_{d(q)ci}^*)^2} \leq 5\% \; U_n \tag{9}$$

where $U_n$ is the rated voltage at the terminal of direct-drive wind turbine.

9. The method for suppressing sub-synchronous and super-synchronous oscillations for direct-drive wind turbine based on energy compensation according to claim 8, wherein pattern search method is used to determine the compensation coefficients of supplementary branches.

10. A system for suppressing sub-synchronous and super-synchronous oscillations for direct-drive wind turbine based on energy compensation comprising:
  a first processor of transient energy acquisition, used to real-time collect bus voltage and node injection current of the wind turbine and obtain transient energy of the direct-drive wind turbine;
  a second processor of supplementary energy branches construction, used to collect dynamic angle of phase locked loop (PLL) when variation rate of the transient energy of the direct-drive wind turbine is positive and calculate compensation energy and increments of fundamental-frequency voltage of supplementary energy branches based on the bus voltage, the node injection current of the wind turbine, and the dynamic angle of PLL;
  a third processor of parameter optimization of supplementary energy branches, used to determine compensation coefficients of supplementary energy branches according to objective function and constraints, wherein in the objective function, with compensation energy of the supplementary energy branches reaching maximum and the increment of fundamental-frequency voltage being minimum, and for the constraints, the frequency-domain characteristic and fundamental-frequency voltage characteristic of control links being satisfied; and
  a result output, used to introduce the supplementary energy branches after compensation coefficients are determined.

* * * * *